US011073997B2

(12) United States Patent
Sonokawa et al.

(10) Patent No.: US 11,073,997 B2
(45) Date of Patent: Jul. 27, 2021

(54) STORAGE SYSTEM AND DATA MANAGEMENT METHOD OF STORAGE SYSTEM

(71) Applicant: Hitachi, Ltd., Tokyo (JP)

(72) Inventors: Yoshio Sonokawa, Tokyo (JP); Yuki Kuroda, Tokyo (JP); Hirokazu Ogasawara, Tokyo (JP); Kozue Fujii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 57 days.

(21) Appl. No.: 16/568,033

(22) Filed: Sep. 11, 2019

(65) Prior Publication Data

US 2020/0210086 A1 Jul. 2, 2020

(30) Foreign Application Priority Data

Dec. 26, 2018 (JP) .............................. JP2018-243761

(51) Int. Cl.
*G06F 3/06* (2006.01)

(52) U.S. Cl.
CPC .......... *G06F 3/0641* (2013.01); *G06F 3/0608* (2013.01); *G06F 3/0665* (2013.01); *G06F 3/0673* (2013.01)

(58) Field of Classification Search
CPC .... G06F 3/0641; G06F 3/0673; G06F 3/0665; G06F 3/0608; G06F 3/067
See application file for complete search history.

(56) References Cited

U.S. PATENT DOCUMENTS

| 10,082,971 | B1* | 9/2018 | Cao | ......................... G06F 3/065 |
| 2011/0320754 | A1* | 12/2011 | Ichikawa | .............. G06F 3/0647 |
| | | | | 711/165 |
| 2016/0070482 | A1* | 3/2016 | Colgrove | .............. G06F 3/0608 |
| | | | | 711/114 |

FOREIGN PATENT DOCUMENTS

WO 2014/110311 A1 7/2014

* cited by examiner

*Primary Examiner* — Kalpit Parikh
(74) *Attorney, Agent, or Firm* — Procopio, Cory, Hargreaves & Savitch LLP

(57) ABSTRACT

Provided is a storage system and a data management method of a storage system enabling system-wide data deduplication. The storage system has a plurality of storage apparatuses in which one or a plurality of logical volumes are provided. Based on data information of data obtained through the generation of a request to write to a logical volume in the storage system, one storage apparatus among the plurality of storage apparatuses calculates, for a plurality of combinations of storage apparatus and logical volume in the storage system, a data capacity when duplicate data is removed for each of the storage apparatuses, calculates the total of the calculated data capacities as the total capacity of the whole storage system, and performs optimal arrangement arithmetic processing to output information indicating a combination with the smallest total capacity among the plurality of combinations.

9 Claims, 18 Drawing Sheets

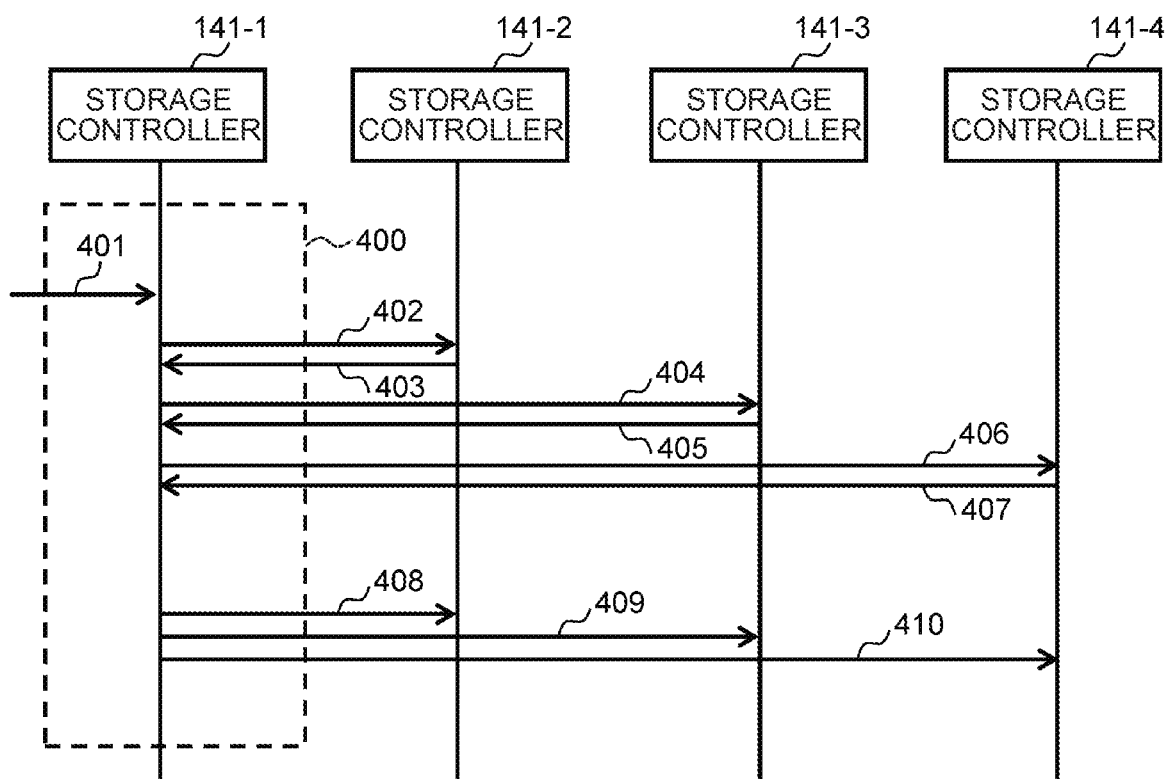

FIG.12

| STORAGE APPARATUS ID | APPARATUS MAXIMUM CAPACITY | APPARATUS USED CAPACITY | VOLUME ID | VOLUME CAPACITY | BLOCK NUMBER | HASH VALUE |
|---|---|---|---|---|---|---|
| storageA (SERIAL NUMBER:A) | 50TB | 40TB | VOL1 | 10TB | 1 | b4dde4825 |
| | | | | | 2 | fed6cd8be |
| | | | ... | | ... | ... |
| | | | VOL4 | 10TB | ... | ... |
| storageB (SERIAL NUMBER:B) | 50TB | 30TB | VOL5 | 20TB | 1 | a290f88d3 |
| | | | | | 2 | 7e65d9390 |
| | | | ... | | ... | ... |
| storageC (SERIAL NUMBER:C) | 40TB | 20TB | ... | | ... | ... |
| storageD (SERIAL NUMBER:D) | 100TB | 50TB | ... | | ... | ... |

| STORAGE APPARATUS ID 1301 | VOLUME ID 1302 | COMPARISON TARGET VOLUME ID 1303 | DATA REDUCTION CAPACITY 1304 |
|---|---|---|---|
| storageB | VOL5 | storageA – VOL1 | 240GB |
| | | storageA – VOL2 | 800GB |
| | | storageA – VOL3 | 400GB |
| | | storageB – VOL4 | 0GB |
| | | ... | ... |
| | VOL6 | storageD – VOL13 | 560GB |
| | | storageA – VOL1 | 0GB |
| | | storageA – VOL3 | 160GB |
| | | ... | ... |
| | VOL7 | storageD – VOL13 | 240GB |
| | | ... | ... |

| STORAGE APPARATUS ID 1401 | VOLUME ID 1402 | COMPARISON TARGET VOLUME ID 1403 | DATA REDUCTION CAPACITY 1404 |
|---|---|---|---|
| storageA | VOL1 | storageA – VOL2 | 0GB |
| | | ... | ... |
| | VOL2 | storageD – VOL13 | 480GB |
| | VOL3 | ... | ... |
| | VOL4 | ... | ... |
| storageB | VOL5 | storageA – VOL1 | 240GB |
| | | ... | ... |
| | | storageD – VOL13 | 560GB |
| storageC | ... | ... | ... |
| storageD | ... | ... | ... |

| VOLUME ID – STORAGE APPARATUS ID |
| --- |
| VOL1 - storageA |
| VOL1 – storageB |
| VOL1 – storageC |
| ⋮ |
| VOL13 - storageD |

FIG. 16

| REFERENCE VOLUME ID | ARRANGEMENT STORAGE APPARATUS ID | APPARATUS MAXIMUM CAPACITY | VOLUME | DATA REDUCTION CAPACITY | VOLUME CAPACITY |
|---|---|---|---|---|---|
| VOL1 | storageA (SERIAL NUMBER:A) | 50TB | storageA-VOL1 | — | 10TB |
| | | | storageA-VOL3 | 800GB | 10TB |
| | | | storageD-VOL13 | 480GB | 8TB |
| | | | storageA-VOL4 | 400GB | 10TB |
| | | | storageC-VOL8 | 360GB | 15TB |
| | | | storageB-VOL5 | 240GB | 20TB |
| | | | ⋮ | | |
| | | | storageA-VOL2 | 0GB | 10TB |

| STORAGE APPARATUS ID | VOLUME MIGRATION DESTINATION |
|---|---|
| storageA | VOL1 |
| | VOL2 → storageC |
| | VOL3 |
| | VOL4 |
| storageB | VOL5 → storageC |
| | VOL6 → storageD |
| | VOL7 → storageD |
| storageC | VOL8 → storageD |
| | VOL9 → storageB |
| storageD | VOL10 → storageB |
| | VOL11 |
| | VOL12 → storageC |
| | VOL13 → storageA |

STORAGE SYSTEM AND DATA MANAGEMENT METHOD OF STORAGE SYSTEM

TECHNICAL FIELD

The present invention relates to a storage system and a data management method of a storage system, and may be suitably applied, for example, to a storage system having a plurality of storage apparatuses in which one or a plurality of logical volumes are provided, and to a data management method of the storage system.

BACKGROUND ART

In recent years, in the storage field, to improve volume capacity usage efficiency, there has been a broad reduction in the data amount of data stored in a volume or the data amount of data to be stored by using compression technology and deduplication technology, and so forth (see PTL 1).

CITATION LIST

Patent Literature

[PTL 1] International Laid-open Publication No. 2014/110311

SUMMARY OF THE INVENTION

Problems to be Solved by the Invention

However, conventionally, the application of deduplication technology has been limited to being between the data stored in each volume within the same storage apparatus, and deduplication across a plurality of storage apparatuses has not been performed. Therefore, in a system environment where a plurality of storage apparatuses exist, like a data center, sometimes the same data exists in two or more storage apparatuses, and greater improvements in volume capacity usage efficiency from a system-wide standpoint are desirable.

The present invention was devised in view of the foregoing points and seeks to propose a storage system and data management method of a storage system which are capable of system-wide data deduplication.

Means to Solve the Problems

In order to solve such problems, the present invention is a storage system having a plurality of storage apparatuses in which one or a plurality of logical volumes are provided, wherein, based on data information of data obtained through the generation of a request to write to a logical volume in the storage system, one storage apparatus among the plurality of storage apparatuses calculates, for a plurality of combinations of storage apparatus and logical volume in the storage system, a data capacity when duplicate data is removed for each of the storage apparatuses, calculates the total of the calculated data capacities as the total capacity of the whole storage system, and performs optimal arrangement arithmetic processing to output information indicating a combination with the smallest total capacity among the plurality of combinations.

Furthermore, the present invention is a data management method of a storage system having a plurality of storage apparatuses in which one or a plurality of logical volumes are provided, the data management method comprising a first step in which, based on data information of data obtained through the generation of a request to write to a logical volume in the storage system, one storage apparatus among the plurality of storage apparatuses calculates, for a plurality of combinations of storage apparatus and logical volume in the storage system, a data capacity when duplicate data is removed for each of the storage apparatuses; a second step of calculating the total of the calculated data capacities as the total capacity of the whole storage system; and a third step of performing optimal arrangement arithmetic processing to output information indicating a combination with the smallest total capacity among the plurality of combinations.

According to the foregoing configuration, because it is possible to specify a combination of storage apparatus and logical volume which has the smallest total capacity when duplicate data is removed, for example, duplicate data can be effectively removed on a system-wide basis.

Advantageous Effects of the Invention

According to the present invention, duplicate data in a storage system can be more appropriately managed.

BRIEF DESCRIPTION OF DRAWINGS

FIG. 3 is a diagram illustrating an example of a hash value table according to the first embodiment.

FIG. 4 is a diagram illustrating an example of a process flow of master controller determination processing according to the first embodiment.

FIG. 12 is a diagram illustrating an example of collection information according to the first embodiment.

FIG. 13 is a diagram illustrating an example of calculation results of data reduction capacity according to the first embodiment.

FIG. 14 is a diagram illustrating an example of overall calculation results of data reduction capacity according to the first embodiment.

FIG. 15 is a diagram illustrating an example of combinations of a reference volume and arrangement storage apparatus according to the first embodiment.

FIG. 16 is a diagram illustrating an example of a method of selecting volumes according to the first embodiment.

FIG. 20 is a diagram illustrating an example of optimal arrangement information according to the first embodiment.

DESCRIPTION OF EMBODIMENTS

One embodiment of the present invention will now be described in detail with reference to the appended drawings. In the embodiments hereinbelow, a configuration that is geared toward improving the usage efficiency of the capacity of the volumes (volume capacity) of the whole storage system will mainly be described.

For example, one storage apparatus of a plurality of storage apparatuses constituting the storage system performs a comparison of the data of each volume in the storage system and calculates combinations of volumes which are the most effective in reducing data through deduplication. Furthermore, for each of these combinations, volumes are re-arranged so that volume groups constituting these combinations are arranged in the same storage apparatus. Consequently, it is possible to improve the volume capacity usage efficiency of the whole storage system.

In addition, when RAW data is exchanged in a comparison of data stored in volumes (volume data), for example, a huge amount of communication between the storage apparatuses is likely. In this regard, in this storage system, the volume data comparison is carried out by exchanging hash values in block units, for example. Accordingly, the amount of communication data between the storage apparatuses due to deduplication processing can be suppressed and it is possible to suppress any adverse effect on I/O (Input/Output) of the host apparatus, for example.

In addition, in computing combinations of volumes which are the most effective in data reduction, for example, raising the computational accuracy is desirable. In this regard, in this storage system, for example, previous volume data reduction capacities are stored and an optimal arrangement, obtained by predicting the volume data reduction capacity from transitions of previous data reduction capacities, is computed. Data reduction accuracy can accordingly be raised.

Note that, in the description hereinbelow, when elements of the same type are described without distinction, common parts (parts excluding suffix numbers) among the reference signs that include suffix numbers are sometimes used, and when elements of the same type are described with a distinction therebetween, reference signs including suffix numbers are sometimes used. For example, when a description is made without distinguishing between role determination units, same appears as "role determination unit 212," whereas when a description is made by distinguishing between individual role determination units, same appear as "role determination unit 212_1A" and "role determination unit 212 2A."

A detailed description is provided hereinbelow. However, the present invention is not limited to the embodiments hereinbelow, rather, embodiments including configurations obtained by making various modifications within the scope of the present invention are possible.

(1) First Embodiment

Figure 1:
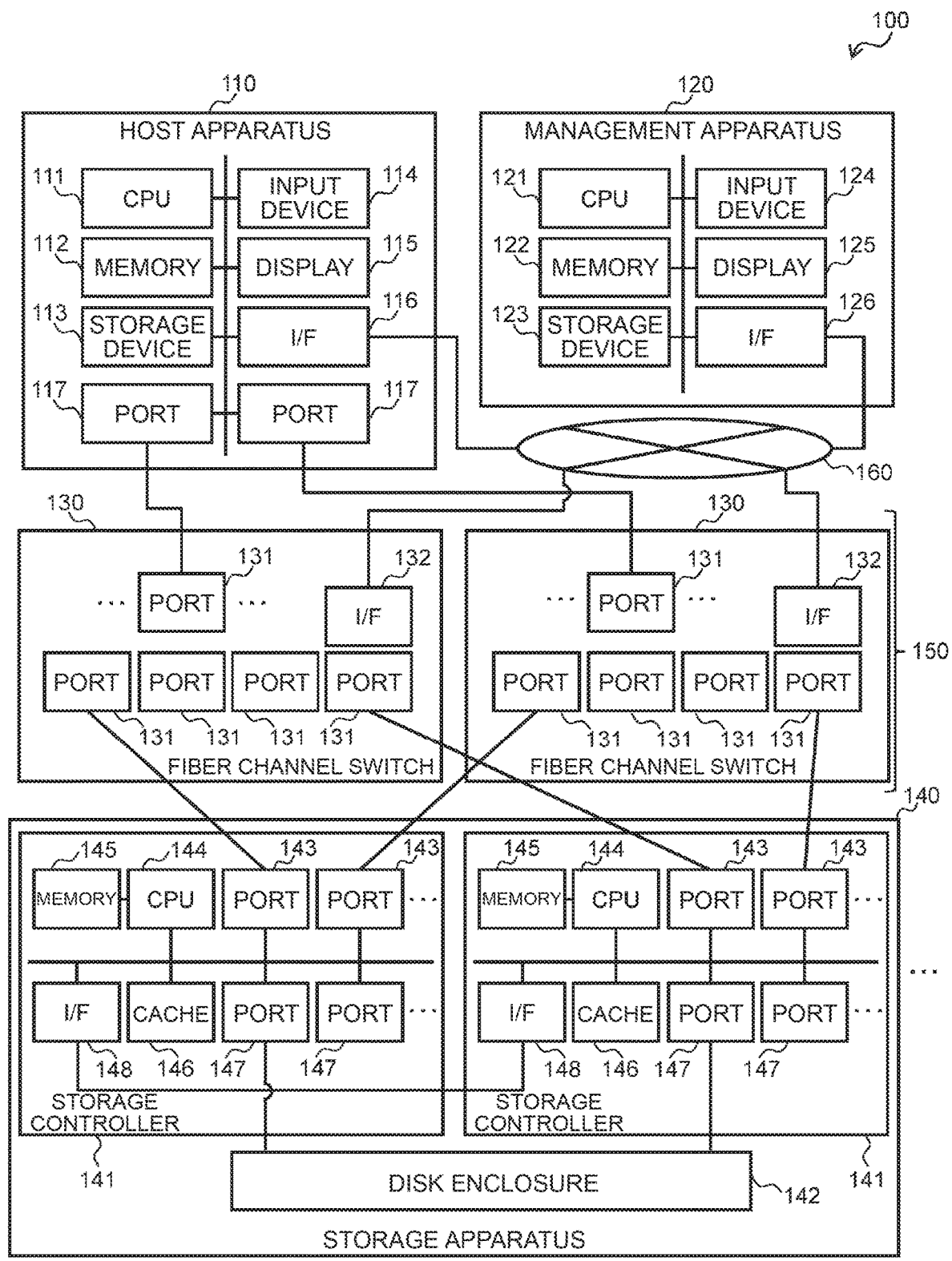
FIG. 1 is a diagram illustrating an example of a configuration of a storage system according to a first embodiment.

In FIG. 1, 100 denotes the whole storage system according to a first embodiment. A storage system 100 is configured comprising a host apparatus 110, a management apparatus 120, a plurality of Fibre Channel switches 130, and a plurality of storage apparatuses 140.

In the storage system 100, the host apparatus 110 and storage apparatuses 140 are communicably coupled via the Fibre Channel switches 130 which constitute a first network 150 (Fibre Channel network). Furthermore, in the storage system 100, the management apparatus 120 and storage apparatuses 140 are communicably coupled via a second network 160 and the Fibre Channel switches 130. Furthermore, the storage apparatuses 140 are communicably coupled via the first network 150. The first network is a SAN (Storage Area Network), for example. The second network 160 is a LAN (Local Area Network), for example. Note that the network configuration is not limited to the foregoing configuration, rather, any suitable configuration can be applied.

The host apparatus 110 is an apparatus which performs information processing relating to tasks and so forth. The host apparatus 110 is configured comprising a CPU (Central Processing Unit) 111, a memory 112, a storage device 113, an input device 114, a display 115, an I/F (interface) 116, and a port 117. The CPU 111 is a processor which is tasked with controlling the overall operation of the host apparatus 110. The memory 112 is a device that stores programs, data, and the like and is a semiconductor storage device such as a RAM (Random Access Memory) or a ROM (Read Only Memory). The storage device 113 is a disk drive or a magneto-optical disk drive, or the like. The input device 114 is a keyboard or pointing device or the like. The display 115 is a liquid crystal display, plasma display, or the like, capable of displaying various information. The I/F 116 is a LAN adapter for coupling to the second network 160. The port 117 is a SAN adapter for coupling to the Fibre Channel switches 130 (first network 150).

The functions of the host apparatus 110 (information processing or the like) may be realized by the CPU 111 reading a program (software) which is stored in the storage device 113 to the memory 112 and executing the program, may be realized by hardware such as a dedicated circuit, or may be realized by a combination of hardware and software, for example. Moreover, a portion of the functions of the host apparatus 110 could also be realized by another computer that is capable of communicating with the host apparatus 110.

For example, the host apparatus 110 receives inputs from a host administrator via the input device 114. The host apparatus 110 also displays the results of information processing, and so forth, on the display 115.

The management apparatus 120 is an apparatus tasked with maintenance management of the whole storage system 100. More specifically, the management apparatus 120 is configured comprising a CPU 121, a memory 122, a storage device 123, an input device 124, a display 125, and an I/F 126. Note that the CPU 121, memory 122, storage device 123, input device 124, display 125, and I/F 126 may have the same configuration as the CPU 111, memory 112, storage device 113, input device 114, display 115, and I/F 116 of the host apparatus 110, and descriptions of the former parts are therefore omitted.

The functions of the management apparatus 120 (maintenance management of the whole storage system 100, and the like) may be realized by the CPU 121 reading a program (software) which is stored in the storage device 123 to the memory 122 and executing the program, may be realized by hardware such as a dedicated circuit, or may be realized by a combination of hardware and software, for example. Moreover, a portion of the functions of the management apparatus 120 could also be realized by another computer that is capable of communicating with the management apparatus 120.

For example, the management apparatus 120 collects configuration information, performance monitoring information, a failure log, and the like, of the host apparatus 110. Furthermore, the management apparatus 120 collects configuration information, performance monitoring information, a failure log, and the like, of the storage apparatuses 140, for example. The management apparatus 120 also outputs the collected information to the display 125 to present this information to a system administrator. In addition, upon receiving an instruction relating to maintenance management from the system administrator via the input device 124, the management apparatus 120 transmits the instruction to the host apparatus 110 and storage apparatuses 140, and the like.

The Fibre Channel switches 130 are apparatuses that relay data transfers of a Fibre Channel which is one of the connection standards that use optical fiber. The Fibre Channel switches 130 are configured comprising a plurality of ports 131 and I/F 132.

The storage apparatuses 140 are configured comprising one or a plurality of storage controllers 141 (two in this example) and a disk enclosure 142 that includes a memory device. In the storage apparatuses 140, redundancy is established by coupling two storage controllers 141 by means of a dedicated network or a bus, or the like.

The storage controllers 141 are devices that control a storage array. For example, the storage controllers 141 aggregate storage areas in a plurality of memory devices and provide the storage areas to the host apparatus 110 as one storage area. In addition, for example, upon receiving a data write request from the host apparatus 110, the storage controllers 141 determine in which memory device among the plurality of memory devices data is to be disposed, and store the data in the determined memory device. Furthermore, for example, upon receiving a data read request from the host apparatus 110, the storage controllers 141 determine the storage position of the data, read the data from the memory device in the determined storage position, and transfer the data to the host apparatus 110. In addition to reading and writing data, for example, the storage controllers 141 perform processing relating to volume capacity dynamic allocation (capacity virtualization), snapshot acquisition, volume migration, and volume data capacity reduction.

More specifically, the storage controllers 141 are configured comprising a Fibre Channel port 143 (front-end port), a CPU 144, a memory 145, a cache 146, a memory device port 147 (back-end port), and a connection I/F 148 for coupling to the storage controllers 141.

The Fibre Channel port 143 is a SAN adapter for coupling to the Fibre Channel switches 130. The CPU 144 is a processor which is tasked with controlling the overall operation of the storage apparatuses 140. For example, the CPU 144 performs data arrangement, parity calculations, and so forth, based on RAID (Redundant Arrays of Independent Disks) configuration information. In addition, for example, the CPU 144 realizes the functions of the storage apparatuses 140 (for example, a hash value generation unit 211, a role determination unit 212, a data reduction capacity arithmetic processing unit 213, an optimal arrangement arithmetic processing unit 214, a migration execution unit 215, and a deduplication execution unit 216, and the like, which will be described subsequently). Note that the functions of the storage apparatuses 140 may be realized by the CPU 144 reading a program (software) to the memory 145 and executing the program, may be realized by hardware such as a dedicated circuit, or may be realized by a combination of hardware and software, for example. Moreover, a portion of the functions of the storage apparatuses 140 could also be realized by another computer that is capable of communicating with the storage apparatuses 140. The memory 145 is a device that stores programs, data, and the like and is a semiconductor storage device such as a RAM or ROM. The cache 146 is a device that temporarily stores data that is input between the host apparatus 110 and the memory devices and is a semiconductor memory, for example. The memory device port 147 is an interface for coupling to the disk enclosure 142. The I/F 148 is an interface for coupling to another storage controller 141.

Here, the storage apparatuses 140 have a storage hierarchy as follows. For example, a disk array is configured from a plurality of memory devices. The disk array is managed by the CPU 144 as a physical device. In addition, the CPU 144 associates memory devices (physical devices) that are built into the storage apparatuses 140 and logical units (real volumes) obtained as a result of logically partitioning the disk array. Logical units are associated with LUN (Logical Unit Numbers) allocated to each port 143 and are provided to the host apparatus 110 as devices in the storage apparatuses 140. The host apparatus 110 performs recognition of logical units in the storage apparatuses 140, and the host apparatus 110 accesses data stored in the storage apparatuses 140 by using the LUN for identifying logical units that have been allocated to the port 143. Note that the logical units may also be partitioned into a plurality of real volumes if necessary.

In addition, in the storage system 100, volumes provided to the host apparatus 110 are not limited to real volumes and not constrained to a physical configuration, and may instead be virtual volumes taken from a pool to virtually allocate a capacity equal to or larger than the physical capacity to the host apparatus 110. In this embodiment example, volumes are referred to as volumes (or logical volumes) when there is no need to distinguish between real and virtual volumes.

Figure 2:
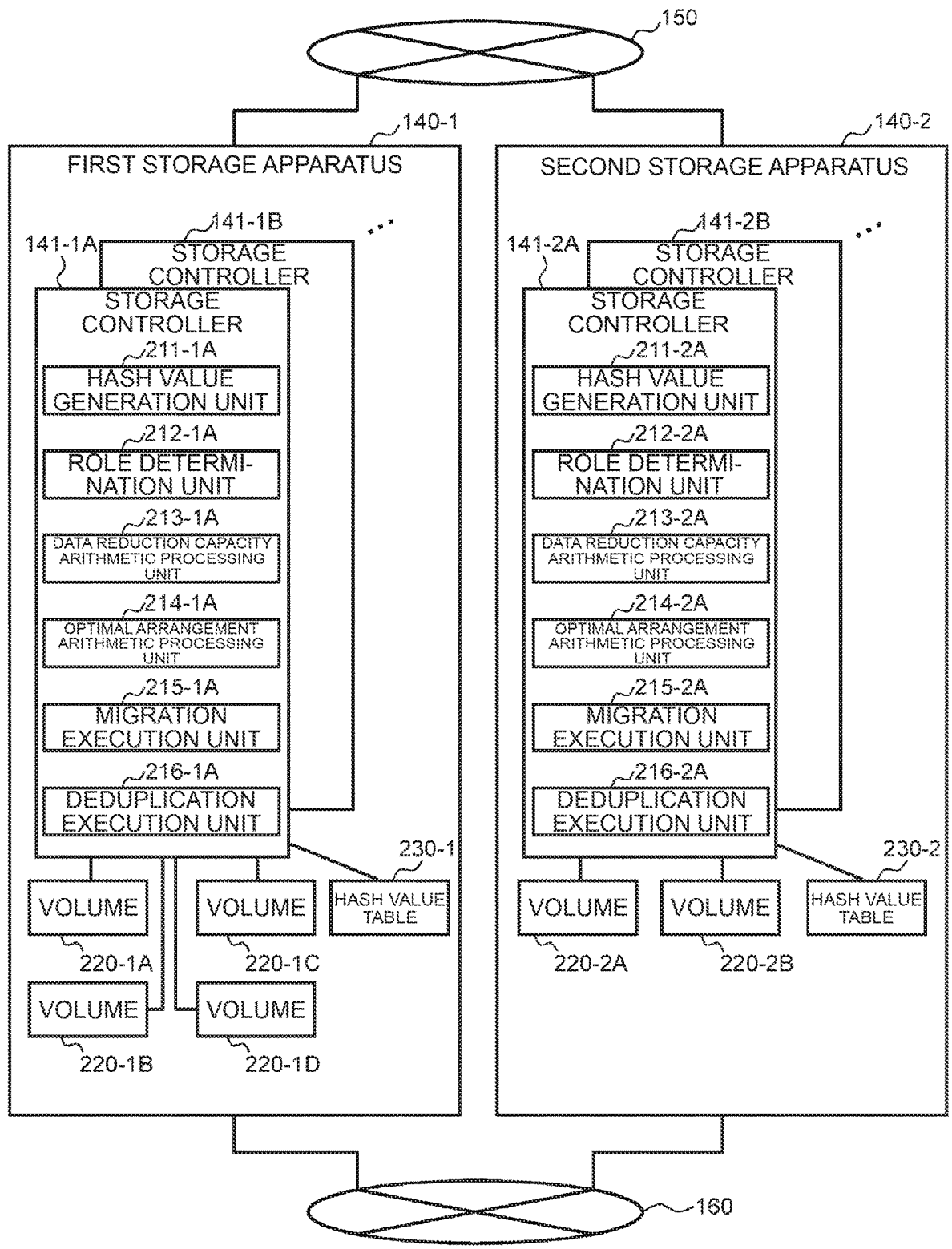
FIG. 2 is a diagram illustrating an example of a configuration of storage apparatuses according to the first embodiment.

FIG. 2 is a diagram illustrating an example of a configuration pertaining to the storage apparatuses 140. Here, a first storage apparatus 140-1 and second storage apparatus 140-2 are described by way of an example.

The first storage apparatus 140-1 is configured comprising a storage controller 141-1A, a storage controller 141-1B, a plurality of volumes 220-1 (a volume 220-1A, a volume 220-1B, a volume 220-1C, and a volume 220-1D), and a hash value table 230-1. The storage controller 141-1A, for example, is an active device. The storage controller 141-1B, for example, is a standby device. Note that, when a fault has occurred in the storage controller 141-1A, the storage controller 141-1B switches from being a standby device to an active device.

The storage controller 141-1A is configured comprising a hash value generation unit 211-1A, a role determination unit 212-1A, a data reduction capacity arithmetic processing unit 213-1A, an optimal arrangement arithmetic processing unit 214-1A, a migration execution unit 215-1A, and a deduplication execution unit 216-1A.

When a data write request is generated for the volume 220-1, for example, the hash value generation unit 211-1A uses a hash function to generate a write data hash value and stores the hash value in the hash value table 230-1. The hash value generation unit 211-1 generates hash values in block units for each volume 220-1 (VOL). Blocks are the minimum units for storing data in the volumes 220. The hash values for data (block data) that is stored in each block are stored in the hash value table 230-1. Note that, when there is a data update due to writing, the hash value generation unit 211-1 generates hash values for the updated data.

The role determination unit 212-1A determines a controller 141 (master controller) for performing computation of an optimal arrangement within the network 150, for example.

The data reduction capacity arithmetic processing unit 213-1A uses the hash values generated by each of the storage apparatuses 140 (the hash value generation unit 211) to calculate the data reduction capacity for volumes 220 of its own storage apparatus 140 and volumes 220 which are arranged in the other storage apparatus 140, for example. For example, the data reduction capacity arithmetic processing unit 213 calculates "8 kbytes" as the data reduction capacity when a hash value of block data A (8 kbytes) is included in a first volume 220 and when the hash value of block data A (8 kbytes) is also included in a second volume 220.

The optimal arrangement arithmetic processing unit 214-1A calculates a combination of volumes 220 which are aggregated in one storage apparatus to increase the data reduction effect based on the data reduction capacity calculated by each storage apparatus 140 (data reduction capacity arithmetic processing unit 213), for example.

The migration execution unit 215-1A shifts the volumes 220 according to the combination calculated by the optimal arrangement arithmetic processing unit 214, for example.

The deduplication execution unit 216-1A executes removal of duplicate data in the storage apparatuses 140.

In the foregoing example, it can be seen that the deduplication execution unit 216-1A calculates the data reduction capacity in each storage apparatus 140, receives the data reduction capacity calculated by a representative storage apparatus 140 (the storage apparatus 140 having the master controller determined by the role determination unit 212), and calculates a combination of volumes 220 that are aggregated in one storage apparatus to increase the data reduction effect based on the received data reduction capacity. However, this embodiment is not limited to or by this configuration. For example, a configuration is possible in which the representative storage apparatus 140 calculates the data reduction capacity by acquiring the hash values generated by each of the storage apparatuses 140, and calculates a combination of volumes 220 which have been aggregated in one storage apparatus to increase the data reduction effect based on the calculated data reduction capacity.

Note that the storage controller 141-1B has the same configuration as the storage controller 141-1A and therefore a description of the former is omitted.

The hash value table 230-1 is stored (held) in a shared resource (for example, the disk enclosure 142) which is accessible to the storage controllers 141-1A and 141-1B. Note that a hash value table 230 will be described subsequently using FIG. 3.

The second storage apparatus 140-2 is configured comprising a storage controller 141-2A, a storage controller 141-2B, a plurality of volumes 220-2 (a volume 220-2A and a volume 220-2B), and a hash value table 230-2. Note that the storage controllers 141-2 have the same configuration as the storage controllers 141-1 and therefore a description of the former is omitted.

FIG. 3 is a diagram illustrating an example of the hash value table 230. The hash value table 230 stores information of block numbers 301 and hash values 302 in association with one another. The block numbers 301 are identifiers that render blocks where block data is stored identifiable. The hash values 302 are hash values of block data.

Deduplication processing will be described next. Broadly speaking, the deduplication processing includes master controller determination processing which determines a storage controller 141 (master controller) for performing computation of the optimal arrangement within the storage system 100, and optimal arrangement processing in which the master controller performs computation of an optimal arrangement. First, the process flow pertaining to deduplication processing will be described using FIGS. 4 to 6. Deduplication processing will be described next using FIGS. 7 to 11.

FIG. 4 is a diagram illustrating an example of a process flow pertaining to the master controller determination processing (a process flow when there is a request to start optimal arrangement).

Here, a case where the storage system 100 includes storage apparatuses 140-1 to 140-4 is described by way of example. In addition, in this example, the storage controller 141-1 of the storage apparatus 140-1 receives a request, via the management apparatus 120, to start optimal arrangement. In this case, the storage controller 141-1 performs an optimal arrangement start request process 400. Note that the details of the optimal arrangement start request process 400 will be provided subsequently using FIG. 7.

Note that the master controller determination processing is not limited to a configuration in which an optimal arrangement start request is executed by the storage controller 141 which has received the request from the management apparatus 120, rather, the master controller determination processing may also be executed at regular intervals (for example, once a week) by each of the storage controllers 141.

Upon receiving an optimal arrangement start request (process flow 401), the storage controller 141-1 acquires its own optimal arrangement execution state, acquires an optimal arrangement execution state from the storage controller 141-2 (process flows 402 and 403), acquires an optimal arrangement execution state from the storage controller 141-3 (process flows 404 and 405), and acquires an optimal arrangement execution state from the storage controller 141-4 (process flows 406 and 407).

Where there is no storage controller 141 executing optimal arrangement, the storage controller 141-1 instructs the storage controller 141-2 to execute optimal arrangement (process flow 408), instructs the storage controller 141-3 to execute optimal arrangement (process flow 409), and instructs the storage controller 141-4 to execute optimal arrangement (process flow 410).

Figure 5:
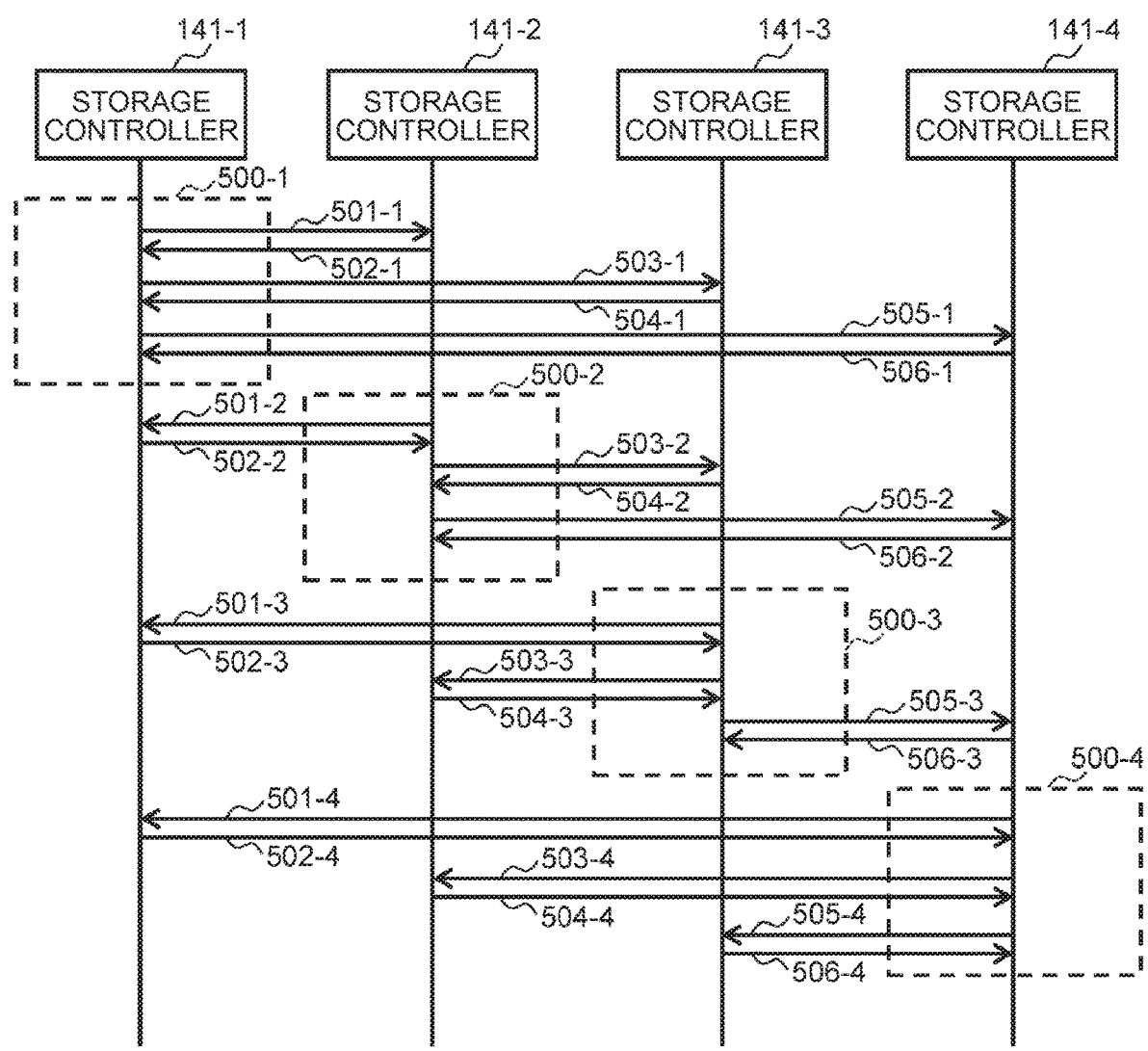
FIG. 5 is a diagram illustrating an example of a process flow of master controller determination processing according to the first embodiment.

FIG. 5 is a diagram illustrating an example of a process flow pertaining to the master controller determination processing (a process flow which is executed when the storage controllers 141 receive an instruction to execute optimal arrangement).

Upon receiving an instruction to execute optimal arrangement (process flows 408, 409, 410; in the case of a master controller, when an instruction to execute optimal arrangement is transmitted), the storage controllers 141 perform an optimal arrangement execution instruction reception process 500. Note that the details of the optimal arrangement execution instruction reception process 500 will be provided subsequently using FIG. 8.

The storage controller 141-1 acquires the ID (identification) and fault state of the storage controller 141-2 from the storage controller 141-2 (process flows 501-1 and 502-1), acquires the ID and fault state of the storage controller 141-3 from the storage controller 141-3 (process flows 503-1 and 504-1), and acquires the ID and fault state of the storage controller 141-4 from the storage controller 141-4 (process flows 505-1 and 506-1). Furthermore, the storage controller 141-1 determines the storage controller 141-1 to be the master controller among the storage controllers 141 which are not in a fault state, when the ID of its own storage controller 141-1 is the smallest.

The storage controller 141-2 acquires the ID and fault state of the storage controller 141-1 from the storage controller 141-1 (process flows 501-2 and 502-2), acquires the ID and fault state of the storage controller 141-3 from the storage controller 141-3 (process flows 503-2 and 504-2), and acquires the ID and fault state of the storage controller 141-4 from the storage controller 141-4 (process flows 505-2 and 506-2). Furthermore, the storage controller 141-2 determines the storage controller 141-2 to be the master controller among the storage controllers 141 which are not in a fault state, when the ID of its own storage controller 141-2 is the smallest.

The storage controller 141-3 acquires the ID and fault state of the storage controller 141-1 from the storage controller 141-1 (process flows 501-3 and 502-3), acquires the ID and fault state of the storage controller 141-2 from the storage controller 141-2 (process flows 503-3 and 504-3), and acquires the ID and fault state of the storage controller 141-4 from the storage controller 141-4 (process flows 505-3 and 506-3). Furthermore, the storage controller 141-3 determines the storage controller 141-3 to be the master controller among the storage controllers 141 which are not in a fault state, when the ID of its own storage controller 141-3 is the smallest.

The storage controller 141-4 acquires the ID and fault state of the storage controller 141-1 from the storage controller 141-1 (process flows 501-4 and 502-4), acquires the ID and fault state of the storage controller 141-2 from the storage controller 141-2 (process flows 503-4 and 504-4), and acquires the ID and fault state of the storage controller 141-3 from the storage controller 141-3 (process flows 505-4 and 506-4). Furthermore, the storage controller 141-4 determines the storage controller 141-4 to be the master controller among the storage controllers 141 which are not in a fault state, when the ID of its own storage controller 141-4 is the smallest.

Figure 6:
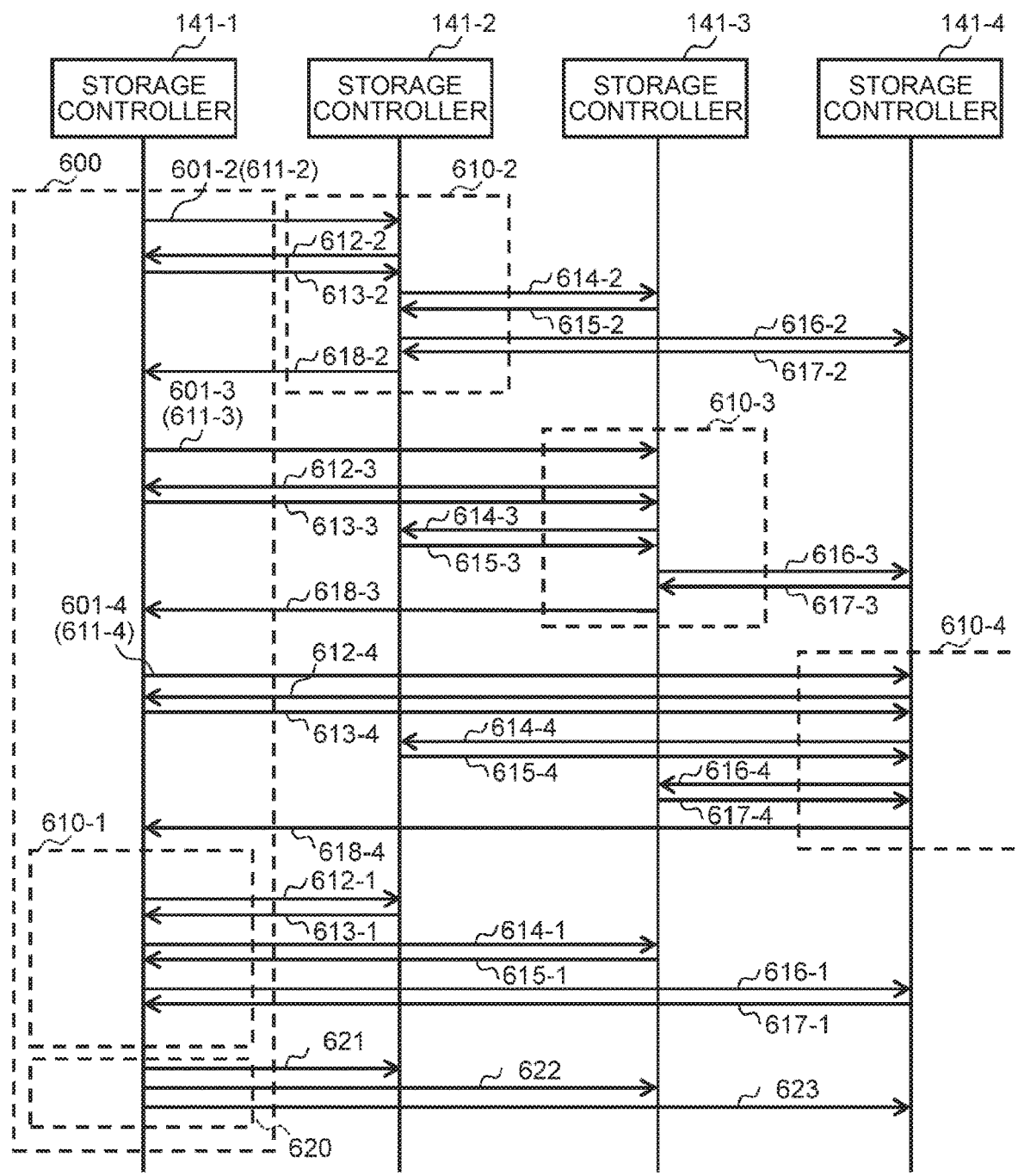
FIG. 6 is a diagram illustrating an example of a process flow of optimal arrangement processing according to the first embodiment.

FIG. 6 is a diagram illustrating an example of a process flow (optimal arrangement process 600) pertaining to the optimal arrangement processing (a process flow when the master controller performs computation of an optimal arrangement). In this example, a case in which the storage controller 141-1 is determined as being the master controller is described by way of example. Note that the details of the optimal arrangement process 600 will be provided subsequently using FIGS. 9 and 10.

The storage controller 141-1 instructs the storage controller 141-2 to calculate the data reduction capacity (data reduction capacity calculation instruction) (process flow 601-2), instructs the storage controller 141-3 to calculate the data reduction capacity (process flow 601-3), and instructs the storage controller 141-4 to calculate the data reduction capacity (process flow 601-4).

Here, the storage controllers 141 each perform a data reduction capacity calculation process 610 upon receiving the instruction to calculate the data reduction capacity. Note that the details of the data reduction capacity calculation process 610 will be provided subsequently using FIG. 11.

When the storage controller 141-2 receives the instruction to calculate the data reduction capacity (process flow 611-2), the storage controller 141-2 acquires information of volume 220-1 from the storage controller 141-1 (process flows 612-2 and 613-2), acquires information of volume 220-3 from the storage controller 141-3 (process flows 614-2 and 615-2), and acquires information of volume 220-4 from the storage controller 141-4 (process flows 616-2 and 617-2). Furthermore, the storage controller 141-2 compares volume 220-2 in its own storage apparatus 140 with other acquired volumes 220, calculates the data reduction capacity, and transmits the calculated result to the storage controller 141-1 (process flow 618-2).

When the storage controller 141-3 receives the instruction to calculate the data reduction capacity (process flow 611-3), the storage controller 141-3 acquires information of volume 220-1 from the storage controller 141-1 (process flows 612-3 and 613-3), acquires information of volume 220-2 from the storage controller 141-2 (process flows 614-3 and 615-3), and acquires information of volume 220-4 from the storage controller 141-4 (process flows 616-3 and 617-3). Furthermore, the storage controller 141-3 compares volume 220-3 in its own storage apparatus 140 with other acquired volumes 220, calculates the data reduction capacity, and transmits the calculated result to the storage controller 141-1 (process flow 618-3).

When the storage controller 141-4 receives the instruction to calculate the data reduction capacity (process flow 611-4), the storage controller 141-4 acquires information of volume 220-1 from the storage controller 141-1 (process flows 612-4 and 613-4), acquires information of volume 220-2 from the storage controller 141-2 (process flows 614-4 and 615-4), and acquires information of volume 220-3 from the storage controller 141-3 (process flows 616-4 and 617-4). Furthermore, the storage controller 141-4 compares volume 220-4 in its own storage apparatus 140 with other acquired volumes 220, calculates the data reduction capacity, and transmits the calculated result to the storage controller 141-1 (process flow 618-4).

Note that the storage controller 141-1 acquires information of volume 220-2 from the storage controller 141-2 (process flows 612-1 and 613-1), acquires information of volume 220-3 from the storage controller 141-3 (process flows 614-1 and 615-1), and acquires information of volume 220-4 from the storage controller 141-4 (process flows 616-1 and 617-1). Furthermore, the storage controller 141-1 compares volume 220-1 in its own storage apparatus 140 with other acquired volumes 220 and calculates the data reduction capacity.

The storage controller 141-1 also performs optimal arrangement arithmetic processing based on the data reduction capacity transmitted from the storage controllers 141-2, 141-3, and 141-4. Although more details will be provided subsequently using FIG. 10, in optimal arrangement arithmetic processing, arrangement of the volumes 220 for which deduplication has a data reduction effect is determined.

In addition, the storage controller 141-1 performs a migration execution process 620. Based on the results of optimal arrangement arithmetic processing by each of the storage controllers 141, the storage controller 141-1 instructs the storage controller 141-2 to perform re-arrangement (execute migration) of the volumes 220 (process flow 621), instructs the storage controller 141-3 to perform re-arrangement of the volumes 220 (process flow 622), and instructs the storage controller 141-4 to perform re-arrangement of the volumes 220 (process flow 623).

Here, a configuration in which the storage controllers 141 execute migration based on a user instruction is also possible, or a configuration is possible in which the storage controllers 141 make a determination and perform execution according to a threshold value configured in the storage system 100. Possible threshold values include a value at which the data reduction effect is improved by at least 10% over its value prior to rearrangement of the volumes 220. In the case of a configuration where migration is executed automatically according to the threshold value, a configuration in which the migration results are displayed on the display 125 of the management apparatus 120, and if necessary, the administrator is also able to restore the migration, is suitably adopted.

In addition, there are no limitations on the migration method. for example, a method in which a task of the host apparatus 110 is halted, data of a migration-source volume 220 is moved to a migration-destination volume 220 via the management apparatus 120, the access path is switched to the migration-destination volume 220, and the task is restarted is also possible. In addition, for example, a method is possible in which, in the case of a virtual volume, data is copied from a migration-source virtual volume to a migration-destination virtual volume, and when reading and writing of data online is accepted by the host apparatus 110 while migration is being executed and write I/O from the host apparatus 110 are generated during data copying, only differential data is copied directly to the migration-destination virtual volume, and copying is repeated until a differential no longer exists. Migration may also be performed using another well-known method.

Note that, although omitted from the drawings, the storage controllers 141 may perform processing to remove duplicate data when migration is complete. Here, removal of duplicate data without performing migration is also conceivable. In such a case, when data that not been removed is modified and data no longer matches, restoration processing between the storage apparatuses 140 becomes necessary, which will likely induce a drop in the performance of the storage system 100 due to an increase in the processing burden or an increase in communication costs, and so forth. Therefore, in this storage system 100, this situation is avoided by migrating volumes 220 so that the volumes 220 targeted for deduplication are aggregated (put to one side) in one storage apparatus 140.

Figure 7:
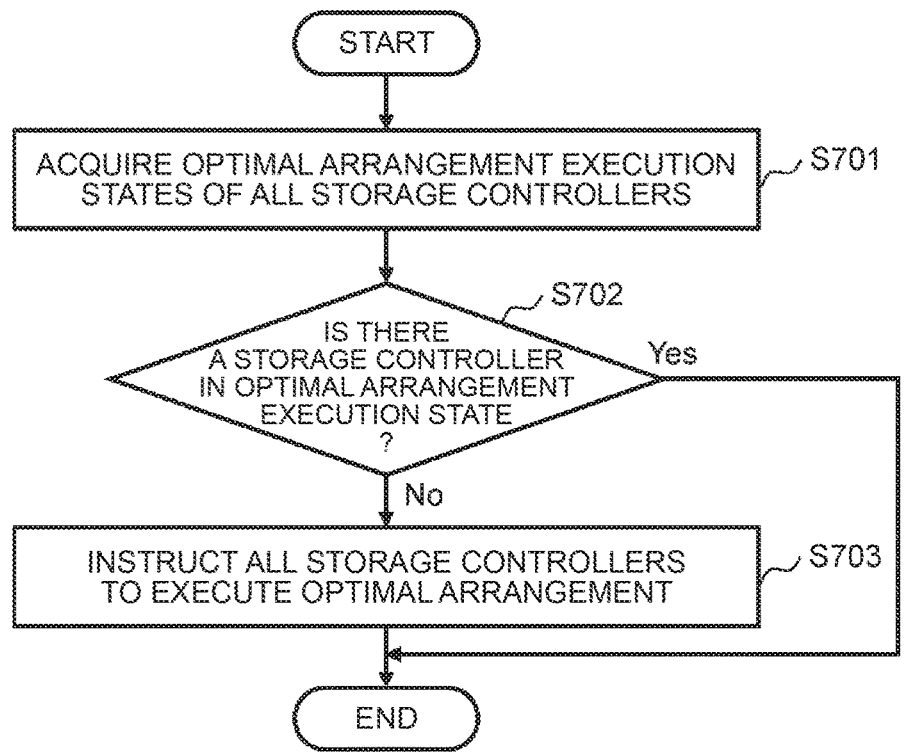
FIG. 7 is a diagram illustrating an example of a flowchart of processing at the time of an optimal arrangement start request according to the first embodiment.

FIG. 7 is a diagram illustrating an example of a flowchart of the optimal arrangement start request process 400. The optimal arrangement start request process 400 is performed by the storage controller 141 (the role determination unit 212, for example) of the storage apparatus 140 which has received the optimal arrangement start request.

In step S701, the role determination unit 212 acquires the optimal arrangement execution states of all the storage controllers 141.

In step S702, the role determination unit 212 determines whether or not there is already a storage controller 141 in the optimal arrangement execution state. When it is determined that there is such a storage controller 141, the role determination unit 212 ends the optimal arrangement start request process 400, and when it is determined that there is none, the role determination unit 212 moves the processing to step S703.

In step S703, the role determination unit 212 instructs all the storage controllers 141 to execute optimal arrangement and ends the optimal arrangement start request process 400.

Figure 8:
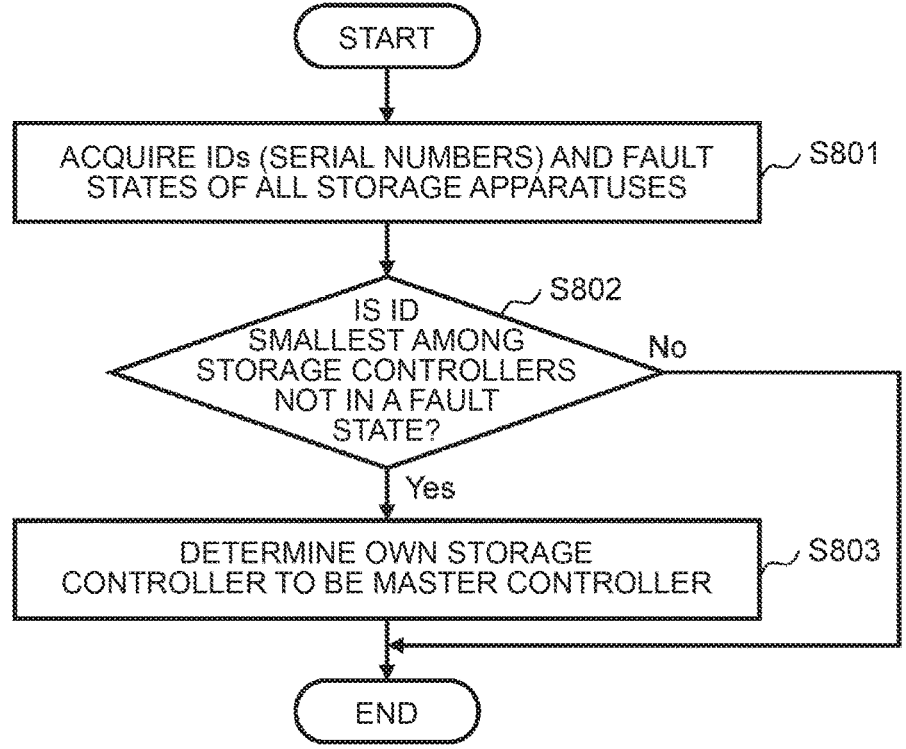
FIG. 8 is a diagram illustrating an example of a flowchart of processing at the time of receiving an optimal arrangement execution instruction according to the first embodiment.

FIG. 8 is a diagram illustrating an example of a flowchart pertaining to the optimal arrangement execution instruction reception process 500. The optimal arrangement execution instruction reception process 500 is performed by the storage controllers 141 (the role determination unit 212, for example) of the storage apparatus 140 which has received an optimal arrangement execution instruction.

In step S801, the role determination unit 212 acquires the IDs (serial numbers, for example) and fault states of all the storage controllers 141.

In step S802, the role determination unit 212 determines whether or not the ID of its own storage controller 141 is the smallest among the storage controllers 141 which are not in a fault state. When it is determined that the ID of its own storage controller 141 is the smallest, the role determination unit 212 moves the processing to step S803, and when it is determined that this ID is not the smallest, the role determination unit 212 ends the optimal arrangement execution instruction reception process 500.

In step S803, the role determination unit 212 determines its own storage controller 141 to be the master controller and ends the optimal arrangement execution instruction reception process 500. Note that the storage controller 141 performs the optimal arrangement process 600 upon being determined as the master controller.

Figure 9:
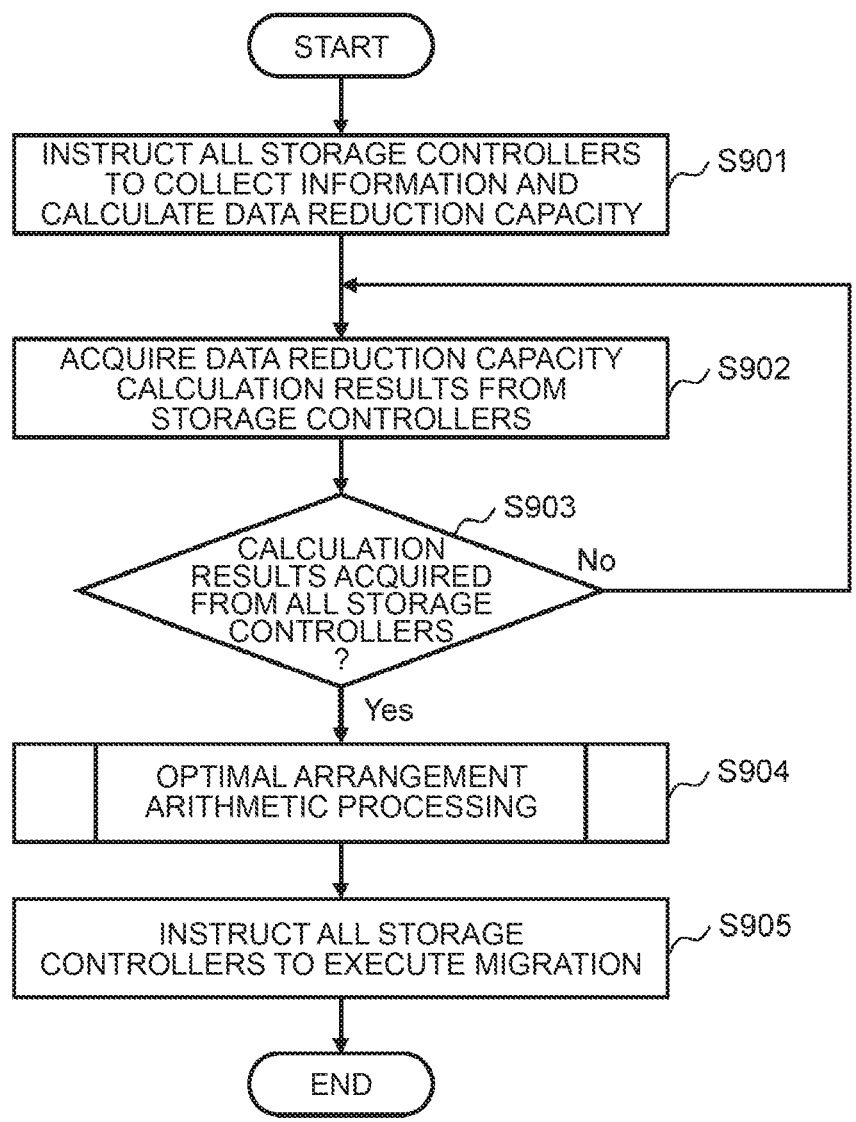
FIG. 9 is a diagram illustrating an example of a flowchart of optimal arrangement processing according to the first embodiment.

FIG. 9 is a diagram illustrating an example of a flowchart of the optimal arrangement process 600. The optimal arrangement process 600 is executed by the master controller (the optimal arrangement arithmetic processing unit 214 and migration execution unit 215, for example).

In step S901, the optimal arrangement arithmetic processing unit 214 instructs all the storage controllers 141 (its own storage apparatus 140 and other storage apparatuses 140 coupled via the network 150) to collect information relating to the volumes 220 and to calculate the data reduction capacity. An example of information that is collected (collected information) is illustrated in FIG. 12.

FIG. 12 is a diagram illustrating an example of collected information (volume information 1200). The volume information 1200 includes information pertaining to the volumes 220. More specifically, the volume information 1200 includes a storage apparatus ID field 1201, an apparatus maximum capacity field 1202, an apparatus used capacity field 1203, a volume ID field 1204, a volume capacity field 1205, a block number field 1206, and a hash value field 1207.

The storage apparatus ID field 1201 includes information that renders the storage apparatuses 140 identifiable. The apparatus maximum capacity field 1202 includes information indicating the maximum capacity of the storage apparatuses 140 (disk enclosure 142). The apparatus used capacity field 1203 includes information indicating the capacity being used by the storage apparatuses 140 (disk enclosure 142). The volume ID field 1204 includes information that renders the volumes 220 provided in the storage apparatuses 140 identifiable. The volume capacity field 1205 includes information indicating the capacities of the volumes 220. The block number field 1206 includes information that renders blocks where block data is stored identifiable. The hash value field 1207 includes hash values of block data.

In step S902, the optimal arrangement arithmetic processing unit 214 acquires the data reduction capacity calculation results from the storage controllers 141. An example of the data reduction capacity calculation results is illustrated in FIG. 13.

FIG. 13 is a diagram illustrating an example of data reduction capacity calculation results (calculation results 1300). The calculation results 1300 include information of a storage apparatus ID field 1301, a volume ID field 1302, a comparison target volume ID field 1303, and a data reduction capacity field 1304. Note that the calculation results 1300 may also include the information of other volume information 1200 (volume capacity, apparatus maximum capacity, and the like).

The storage apparatus ID field 1301 includes information that renders the storage apparatuses 140 identifiable. The volume ID field 1302 includes information that renders the volumes 220 provided in the storage apparatuses 140 identifiable. The comparison target volume ID field 1303 includes information that renders the comparison target volumes 220 identifiable. The data reduction capacity field 1304 includes information indicating the data reduction capacity.

In step S903, the optimal arrangement arithmetic processing unit 214 determines whether or not the acquisition of calculation results from all the storage controllers 141 is complete. When it is determined that the acquisition is complete, the optimal arrangement arithmetic processing unit 214 moves the processing to step S904, and when it is determined that the acquisition is incomplete, the optimal arrangement arithmetic processing unit 214 moves the processing to step S902. An example of calculation results (overall calculation results) when acquisition is complete is illustrated in FIG. 14.

FIG. 14 is a diagram illustrating an example of overall calculation results (overall calculation results 1400). The overall calculation results 1400 include information of a storage apparatus ID field 1401, a volume ID field 1402, a comparison target volume ID field 1403, and a data reduction capacity field 1404. Each field is the same as each field illustrated in FIG. 13, and a description thereof is therefore omitted.

In step S904, the optimal arrangement arithmetic processing unit 214 performs optimal arrangement arithmetic processing. In the optimal arrangement arithmetic processing, the optimal arrangement of the volumes 220 is computed (determined). Note that the details of the optimal arrangement arithmetic processing will be provided subsequently using FIG. 10.

In step S905, the migration execution unit 215 instructs all the storage controllers 141 to execute migration based on the optimal arrangement computed by the optimal arrangement arithmetic processing unit 214.

Figure 10:
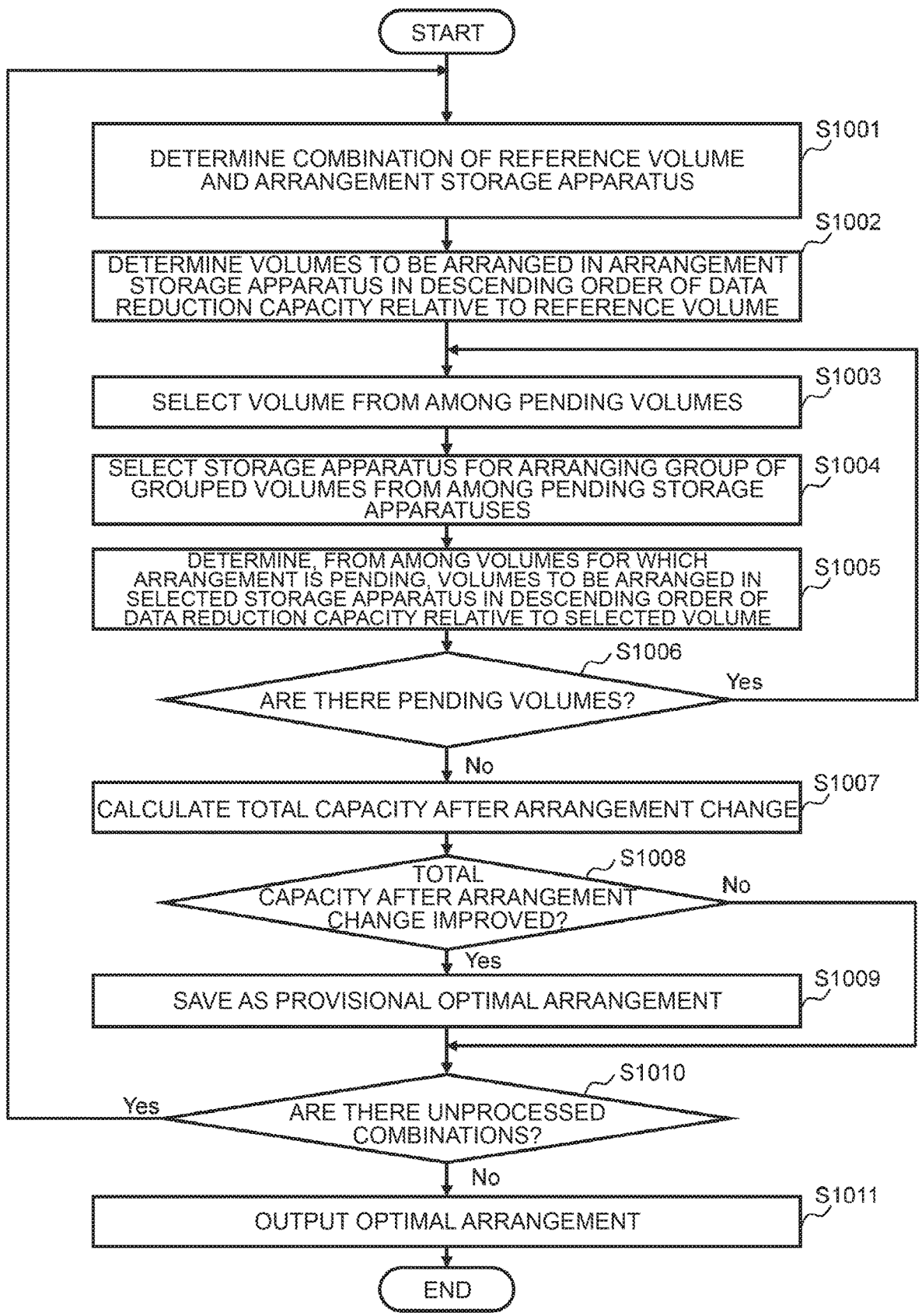
FIG. 10 is a diagram illustrating an example of a flowchart of optimal arrangement arithmetic processing according to the first embodiment.

FIG. 10 is a diagram illustrating an example of a flowchart pertaining to optimal arrangement arithmetic processing.

In step S1001, the optimal arrangement arithmetic processing unit 214 determines a reference volume for grouping the volumes 220 which are to be arranged in the storage apparatuses 140 and determines the storage apparatus 140 (arrangement storage apparatus) for arranging the group of grouped volumes. For example, the optimal arrangement arithmetic processing unit 214 selects an unprocessed combination among combinations of reference volume and arrangement storage apparatus. An example of a combination of a reference volume and an arrangement storage apparatus is illustrated in FIG. 15.

FIG. 15 is a diagram illustrating an example of combinations of a reference volume and an arrangement storage apparatus (processing target combinations 1500). The processing target combinations 1500 include information indicating combinations of a volume ID and a storage apparatus ID. More specifically, in the processing target combinations 1500, combinations of all the volumes 220 and all the storage apparatuses 140 in the storage system 100 are prescribed.

In step S1002, the optimal arrangement arithmetic processing unit 214 refers to the overall calculation results and determines the volumes 220 to be arranged in the arrangement storage apparatus in descending order of data reduction capacity relative to a reference volume. In so doing, the optimal arrangement arithmetic processing unit 214 determines the volumes 220 within a range not exceeding the maximum capacity of the arrangement storage apparatus.

Here, an example in which the reference volume ID is "VOL1" and the arrangement storage apparatus ID is "storageA" (an example of a method for selecting the volume 220) is illustrated in FIG. 16. As illustrated in FIG. 16, within a range not exceeding an apparatus maximum capacity of "50 TB," the optimal arrangement arithmetic processing unit 214 determines the reference volume "VOL1 of storageA," and as volumes 220 in descending order of data reduction capacity relative to the reference volume, determines "VOL3 of storageA," "VOL13 of storageD," and "VOL4 of storageA" as the volumes 220 (arrangement volume group 1601) to be arranged in the arrangement storage apparatus.

Figure 17:
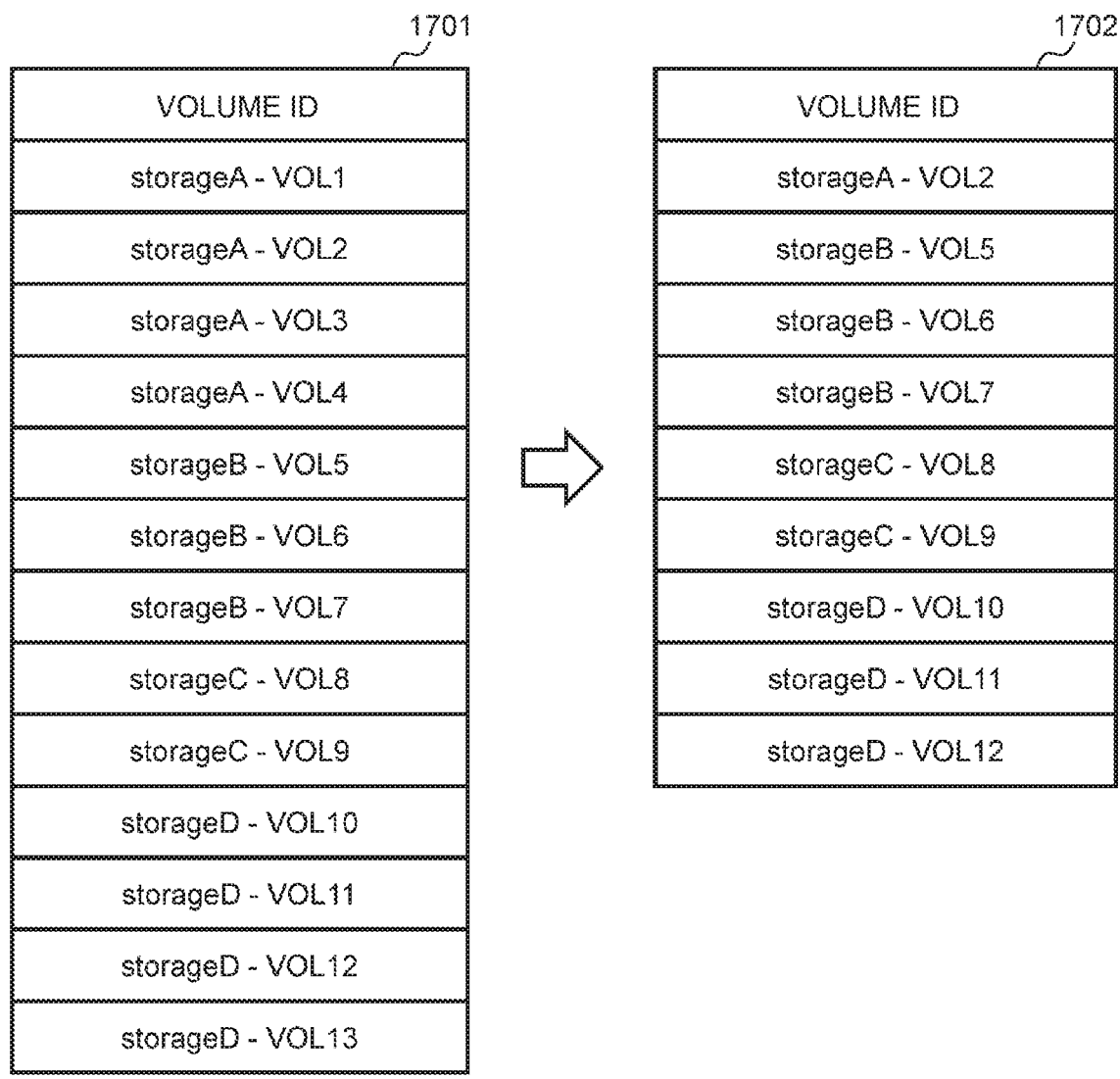
FIG. 17 is a diagram illustrating an example of pending volumes according to the first embodiment.

In step S1003, the optimal arrangement arithmetic processing unit 214 selects (determines) one volume 220 among the volumes 220 whose arrangement is pending (the pending volumes). For example, when the optimal arrangement arithmetic processing unit 214 determines, in a first combination of reference volume and arrangement storage apparatus, "VOL1 of storageA," "VOL3 of storageA," "VOL13 of storageD," and "VOL4 of storageA" as the volumes 220 to be arranged in the arrangement storage apparatus, the optimal arrangement arithmetic processing unit 214 generates a pending volume list 1702 from an all-volume list 1701 and selects one volume from the pending volume list 1702 (the volume 220 with the smallest volume ID, for example), as illustrated in FIG. 17.

Figure 18:
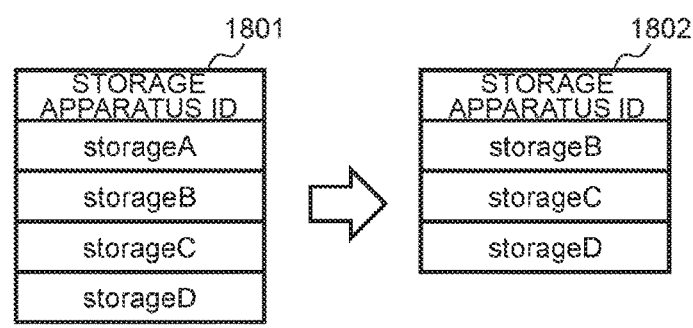
FIG. 18 is a diagram illustrating an example of pending storage apparatuses according to the first embodiment.

In step S1004, the optimal arrangement arithmetic processing unit 214 selects (determines) one storage apparatus 140 from among the storage apparatuses 140 which are pending (pending storage apparatuses). For example, when "storageA" is determined as the arrangement storage apparatus in the first combination of reference volume and arrangement storage apparatus, the optimal arrangement arithmetic processing unit 214 generates a pending storage apparatus list 1802 from an all-storage apparatus list 1801 and selects one storage apparatus 140 from the pending storage apparatus list 1802 (the storage apparatus 140 with the smallest storage apparatus ID, for example), as illustrated in FIG. 18.

In step S1005, the optimal arrangement arithmetic processing unit 214 determines the volumes 220 to be arranged in the selected one storage apparatus 140 (the selected storage apparatus) in descending order of data reduction capacity relative to the selected one volume (the selected volume). This processing is the same as the processing of step S1002 and therefore a description of this processing is omitted.

In step S1006, the optimal arrangement arithmetic processing unit 214 determines whether or not there are pending volumes. When it is determined that there are pending volumes, the optimal arrangement arithmetic processing unit 214 moves the processing to step S1003, and when it is determined that there are no pending volumes, the optimal arrangement arithmetic processing unit 214 moves the processing to step S1007.

In step S1007, the optimal arrangement arithmetic processing unit 214 calculates the total capacity (total capacity after an arrangement change) of all the storage apparatuses 140 when the arrangement of the volumes 220 has been changed. More specifically, the optimal arrangement arithmetic processing unit 214 calculates the capacity when duplicate data has been removed in each storage apparatus 140 according to the arrangement of the determined volumes 220 and calculates the total of the capacities of all the storage apparatuses 140 as the total capacity after an arrangement change).

For example, the optimal arrangement arithmetic processing unit 214 calculates the data reduction capacity by comparing the hash values of each of the volumes 200 when a first volume 220, second volume 220, and third volume 220 are arranged in its own storage apparatus 140. Here, when a hash value "A" is commonly included in the first volume 220, second volume 220, and third volume 220, the optimal arrangement arithmetic processing unit 214 calculates the data reduction capacity as the capacity obtained when one of three block data corresponding to the hash value "A" remains and two block data are removed.

In step S1008, the optimal arrangement arithmetic processing unit 214 determines whether or not the total capacity after an arrangement change is smaller than a total capacity taken as a preconfigured target (a target total capacity; for example, a capacity 10% smaller than the total capacity before an arrangement change) (whether or not the total capacity improves). When it is determined that the total capacity improves, the optimal arrangement arithmetic processing unit 214 moves the processing to step S1009, and when it is determined that the total capacity does not improve, the optimal arrangement arithmetic processing unit 214 moves the processing to step S1010.

Figure 19:
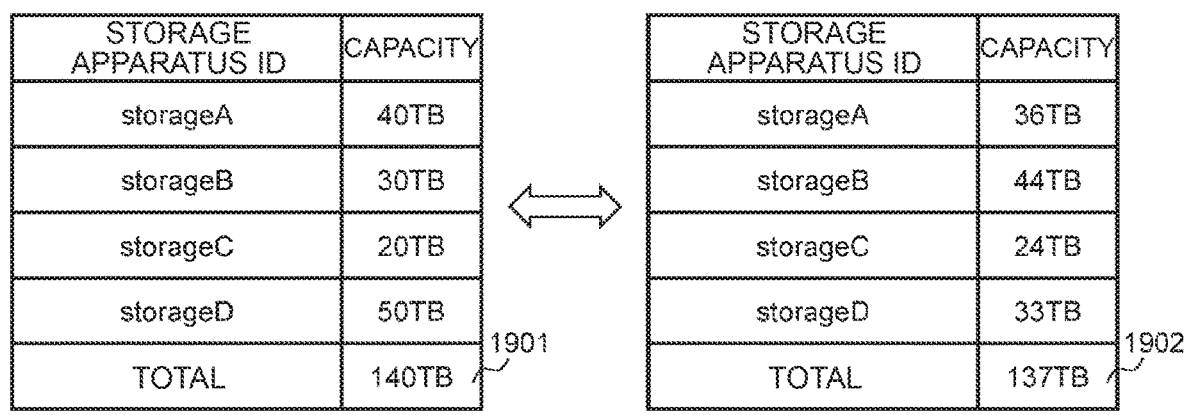
FIG. 19 is a diagram illustrating an example of a target total capacity and a total capacity after an arrangement change, according to the first embodiment.

Here, an example of a target total capacity and a total capacity after an arrangement change is illustrated in FIG. 19. In FIG. 19, it can be seen that a target total capacity 1901 is "140 TB" and a total capacity after an arrangement change 1902 is "137 TB." In this case, it is determined that there is an improvement.

In step S1009, the optimal arrangement arithmetic processing unit 214 saves the optimal arrangement information as a provisional optimal arrangement. In so doing, when a provisional optimal arrangement has already been saved, the optimal arrangement arithmetic processing unit 214 saves optimal arrangement information for a larger data reduction capacity (smaller total capacity after an arrangement change). Note that the configuration is not limited to a configuration in which provisional optimal arrangement information is updated, rather, a configuration in which provisional optimal arrangement information is added is also possible.

FIG. 20 is a diagram illustrating an example of optimal arrangement information (an optimal arrangement table 2000). The optimal arrangement table 2000 stores information of a storage apparatus ID field 2001 and a migration destination field 2002. The migration destination field 2002 includes, in association with one another, volume IDs of volumes 220 included in the storage apparatuses 140 having the corresponding storage apparatus IDs, and storage apparatus IDs of the storage apparatuses 140 (migration destinations) where the corresponding volumes 220 are provided.

In step S1010, the optimal arrangement arithmetic processing unit 214 determines whether or not there are unprocessed combinations among combinations of reference volume and arrangement storage apparatus. When it is determined that there are unprocessed combinations, the optimal arrangement arithmetic processing unit 214 moves the processing to step S1001, and when it is determined that there are no unprocessed combinations, the optimal arrangement arithmetic processing unit 214 moves the processing to step S1011.

In step S1011, the optimal arrangement arithmetic processing unit 214 outputs provisional optimal arrangement information as an optimal arrangement.

For example, the optimal arrangement arithmetic processing unit 214 may report the optimal arrangement information to the migration execution unit 215. The migration execution unit 215 issues an instruction to the other migration execution units 215 according to the optimal arrangement information (transmits optimal arrangement information in step S905, for example). Each migration execution unit 215 executes migration upon receiving the instruction.

Furthermore, for example, the optimal arrangement arithmetic processing unit 214 may transmit the optimal arrangement information to the management apparatus 120. Upon receiving the optimal arrangement information, the management apparatus 120 displays the optimal arrangement information on the display 125, for example. The management apparatus 120 receives an input (a migration execution authorization or the like) made by the administrator via the input device 124 and issues an instruction to the migration execution unit 215 according to the input, for example.

Figure 11:
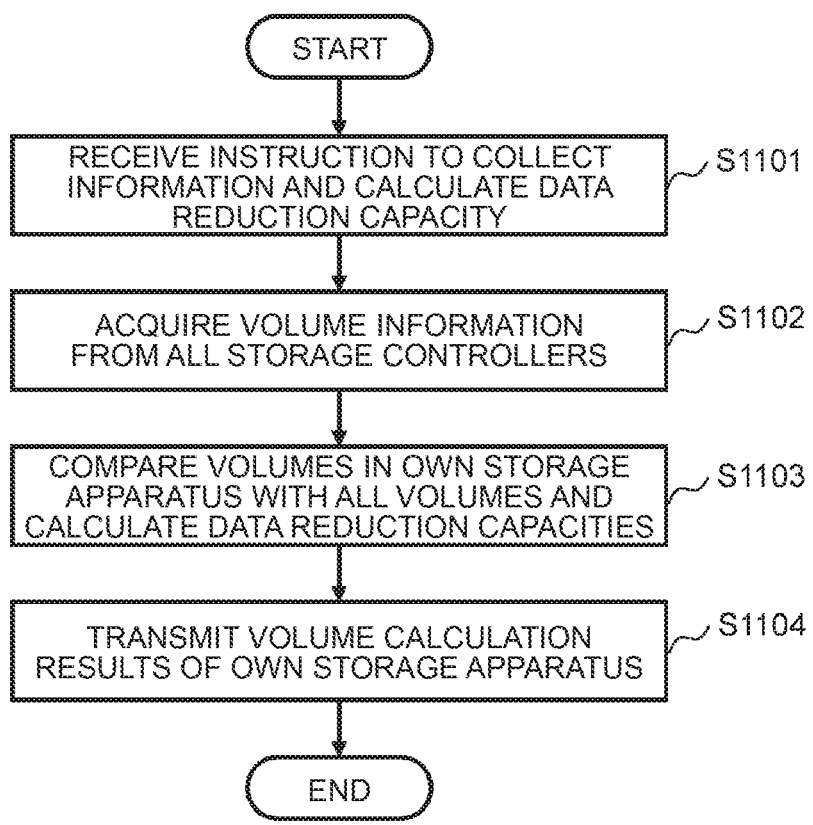
FIG. 11 is a diagram illustrating an example of a flowchart of data reduction capacity calculation processing according to the first embodiment.

FIG. 11 is a diagram illustrating an example of a flowchart pertaining to the data reduction capacity calculation process 610.

In step S1101, the data reduction capacity arithmetic processing unit 213 receives an instruction to collect information from master storage and calculate the data reduction capacity.

In step S1102, the data reduction capacity arithmetic processing unit 213 acquires volume information from all the storage controllers 141 (storage apparatuses 140).

In step S1103, the data reduction capacity arithmetic processing unit 213 compares the volumes 220 in its own storage apparatus 140 with all the volumes 220 (also includes a comparison between the volumes in its own storage apparatus 140), and calculates the data reduction capacity.

Here, a data reduction capacity calculation method which is performed by the data reduction capacity arithmetic processing unit 213 is described by taking one volume 220 (a first volume 220) in its own storage apparatus 140 and one volume 220 (a second volume 220) among all the volumes 220 as examples. In this case, the data reduction capacity arithmetic processing unit 213 specifies matching hash values in the first volume 220 and second volume 220, and takes the sum total of the capacities of the block data with the block numbers corresponding to the specified hash values as the data reduction capacity of the first volume 220 and second volume 220.

In other words, regarding the capacity of the block data with the block numbers corresponding to the hash values, when the blocks have a fixed length, the capacity may be found by multiplying the block fixed length (eight kbytes, for example) by the number of specified hash values, or the capacity may be found by reading the block data with the block numbers corresponding to the specified hash values, or may be found using another method.

In step S1104, the data reduction capacity arithmetic processing unit 213 transmits the calculation results (data reduction capacity) for the volumes 220 of its own storage apparatus 140 (to the master controller).

According to this embodiment, for example, the storage controllers communicate with the storage controllers of the other storage apparatus, perform a comparison of volumes also including the other storage apparatus, and by substituting volumes between storage apparatuses to increase the data reduction effect, the data reduction effect of the whole data center can be improved and the volume capacity usage efficiency can be raised.

(2) Second Embodiment

In this embodiment, a configuration in which an optimal arrangement is found by using a predicted data reduction capacity is described. For a configuration which is the same as the first embodiment, the same reference signs are used and a description of such a configuration is omitted.

In this storage system 100, in step S1103, the data reduction capacity arithmetic processing unit 213 stores the calculated data reduction capacity (calculation result) in a shared resource (the disk enclosure 142, for example) in association with the time (date and time) of the calculation. The data reduction capacity arithmetic processing unit 213 also predicts, in step S1103, the subsequent data reduction capacity from a data reduction capacity transition. Although there are no particular limitations on the prediction method, the data reduction capacity arithmetic processing unit 213 seeks a linear approximation formula and calculates the data reduction capacity after a predetermined time period (one month, for example), as illustrated in FIG. 21, for example.

Figure 21:
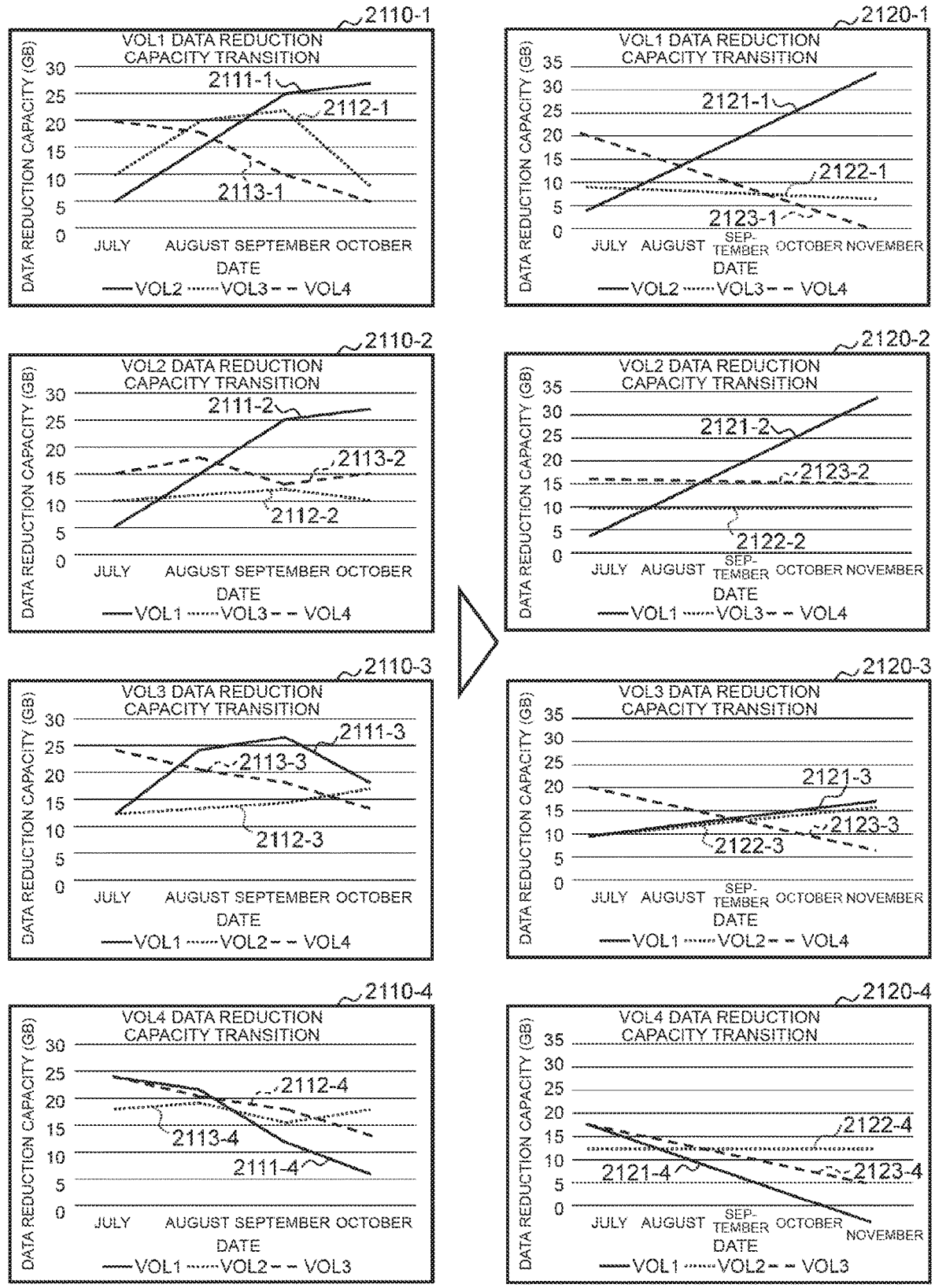
FIG. 21 is a diagram illustrating an example of data reduction capacity transitions and data reduction capacity predictions according to a second embodiment.

FIG. 21 is a diagram illustrating an example of data reduction capacity transitions 2110 representing a transition in the data reduction capacity and data reduction capacity predictions 2120 representing a prediction of the data reduction capacity.

In this example, the data reduction capacity transitions 2110 and data reduction capacity predictions 2120 are shown for one volume 220 in an own storage apparatus 140 and for other volumes (the relationships between "VOL1," "VOL2," "VOL3," and "VOL4," for example). Note that, the same is also true of each of the volumes 220 in the other storage apparatus 140 (the relationships between "VOL1" and "VOL4" to "VOL13," for example), and therefore an illustration of these volumes is omitted.

For example, in a data reduction capacity transition 2110-1, a transition 2111-1 representing the transition of the data reduction capacity of "VOL1" and "VOL2" is illustrated, and in the data reduction capacity transition 2120-1, a straight line 2121-1 which is a linear approximation to the transition 2111-1 is illustrated. According to the straight line 2121-1, when it is currently October, for example, the data reduction capacity in November for "VOL1" and "VOL2" can be predicted.

Furthermore, in step S1104, the data reduction capacity arithmetic processing unit 213 transmits the predicted data reduction capacity to the master controller. The master controller performs computation of the optimal arrangement by using the predicted data reduction capacity.

According to this embodiment, duplicate data can be more effectively removed by using a predicted data reduction capacity.

(3) Other Embodiments

Note that, although, in the foregoing embodiments, a case where the present invention is applied to a storage system is described, the present invention is not limited to or by such a case and can be widely applied to a variety of other systems, apparatuses, methods, and programs.

Moreover, although, in the foregoing embodiments, a case where the storage controller 141-1A is an active device and the storage controller 141-1B is a standby device is described, the present invention is not limited to or by such a case, rather, the storage controller 141-1A and storage controller 141-1B may be active devices. Moreover, the storage controllers 141 provided in the storage apparatuses 140 are not limited to two, and there may instead be three or more thereof. In this case, when one storage controller 141 acquires a slot number of another storage controller 141 and its own storage controller 141 has the lowest number, the one storage controller 141 may perform deduplication processing as the representative controller. Furthermore, for example, when one storage controller 141 acquires load information (CPU utilization, for example) of the other storage controllers 141 and the load of its own storage controller 141 is lowest, the one storage controller 141 may perform deduplication processing as the representative controller. In addition, when a fault is generated in the storage controller 141 which performs deduplication processing, all of the other storage controllers 141 may be configured to detect a fault from a heartbeat and redetermine the representative controller according to the slot number or load information. This enables the other storage controllers 141 to also continue processing after a fault is generated by storing the hash value table 230 in a shared resource.

Furthermore, although, in the foregoing embodiments, a case is described in which, in step S802, the role determination unit 212 determines whether or not the ID of its own storage controller 141 is the smallest among the storage controllers 141 which are not in a fault state, the present invention is not limited to or by such a case, rather, in step S802, the role determination unit 212 may be configured to determine whether or not the load of its own storage controller 141 is lowest among the storage controllers 141 which are not in a fault state.

In addition, although, in the foregoing embodiments, a case is described in which the master controller determination processing starts in response to the storage controllers 141 receiving an optimal arrangement start request, the present invention is not limited to or by such a case, rather, the master controller determination processing may also be configured to start at regular intervals (every week, for example). In this case, the master controller determination processing may also be performed as a result of all the storage controllers 141 acquiring IDs from the other storage controllers 141 and the storage controller 141 with the smallest ID receiving an optimal arrangement start request.

Furthermore, although, in the foregoing embodiments, a case is described in which the data reduction capacity is used in the optimal arrangement arithmetic processing, the present invention is not limited to or by such a case, rather, a hash value matching percentage may also be used.

In addition, although, in the foregoing embodiments, a case is described in which the actual data reduction capacity is calculated for the total capacity after an arrangement change, the present invention is not limited to or by such a case, rather, the total capacity after an arrangement change may also be estimated from the collected data reduction capacities, for example. For example, when it is determined that the arrangement volume group 1601 illustrated in FIG. 16 is disposed in a storage apparatus A, the optimal arrangement arithmetic processing unit 214 subtracts an estimated data reduction capacity "2.1 TB" from the total volume capacity "38 TB (=10 TB+10 TB+8 TB+10 TB)," and approximates the capacity of the storage apparatus A as "35.9 TB." Thereupon, the estimated data reduction capacity "2 TB" is calculated from 800 GB between VOL1 and VOL3+480 GB between VOL1 and VOL13+400 GB between VOL1 and VOL4 +300 GB between VOL3 and VOL13 (omitted from illustration)+100 GB between VOL3 and VOL4 (omitted from illustration)+20 GB between VOL13 and VOL4 (omitted from illustration).

In addition, although, in the aforementioned embodiments, a method is described in which the amount of calculation is reduced by determining the volumes to be arranged in a target storage apparatus in descending order of data reduction capacity relative to a reference volume, the present invention is not limited to or by such a method, rather, a configuration in which a calculation is performed for all combinations of storage apparatus and volume in the storage system 100 is possible.

Furthermore, although, in the aforementioned embodiments, a case is described where it is determined whether or not the total capacity after an arrangement change is smaller than the target total capacity, the present invention is not limited to or by such a case. For example, a target capacity may be provided for each storage apparatus 140 which is added to or replaces the target total capacity, and when it is determined for all the storage apparatuses 140 that the capacity after an arrangement change is smaller than the target capacity of the storage apparatus 140, it may be determined that there is an improvement.

In addition, "interface" in the foregoing embodiments may be one or more interfaces. The one or more interfaces may be one or more communication interface devices of the same type (for instance, one or more NIC (Network Interface Cards)) or may be two or more communication interface devices of different types (for instance, an NIC and an HBA (Host Bus Adapter)).

Furthermore, "memory" in the foregoing embodiments is one or more memories and may, typically, be a main memory device. At least one memory of the memories may be a volatile memory or may be a nonvolatile memory.

Furthermore, "storage device" in the foregoing embodiments is one or more PDEV and may, typically, be an auxiliary memory device. "PDEV" signifies a physical memory device and is typically a nonvolatile memory device such as an HDD (Hard Disk Drive) or an SSD (Solid State Drive), for example.

Furthermore, "storage resource" in the foregoing embodiments is at least one of a memory unit and at least a portion of a PDEV unit (typically, at least a memory unit).

In addition, "processor" in the foregoing embodiments is one or more processors. At least one processor is typically a microprocessor like a CPU (Central Processing Unit) but could also be another type of processor such as a GPU (Graphics Processing Unit. At least one processor could also be a single-core or multi-core processor. At least one processor could also be a processor in a broader sense such as a hardware circuit which performs some or all of the processing (an FPGA (Field-Programmable Gate Array) or ASIC (Application Specific Integrated Circuit, for example).

Furthermore, although processing is described in the foregoing embodiments with the "program" serving as the subject, prescribed processing is performed as a result of a program being executed by a processor unit while suitably using a storage unit (memory, for example) and/or an interface unit (communications port, for example), and the like, and hence the subject of the processing may be a processor. Processing which is described with the program serving as the subject of the sentence may be processing that is performed by a processor unit or by an apparatus which comprises the processor unit. In addition, the processor unit may include a hardware circuit which performs some or all of the processing (an FPGA (Field-Programmable Gate Array) or ASIC (Application Specific Integrated Circuit, for example). A program could also be installed on an apparatus like a computer, from a program source. A program source may, for example, be a program distribution server or a computer-readable recording medium (for example, a non-temporary recording medium). Furthermore, in the description hereinbelow, two or more programs could be implemented as one program, or one program could be implemented as two or more programs.

Moreover, in the foregoing embodiments, the configuration of each table is an example, and one table may be divided into two or more tables, or all or a portion of two or more tables could also be one table.

Furthermore, although various data have been described in the foregoing embodiments by using tables with various names for the sake of the description, the data structure is not limited, and the data may be represented by variously named information and the like.

Moreover, in the foregoing descriptions, the information of the programs, tables, files and the like representing each of the functions can be placed on storage devices such as memory, hard disks and SSD (Solid State Drives), or on recording media such as IC cards, SD cards and DVDs.

Here, the storage system according to the present invention is, for example, a storage system (the storage system 100, for example) having a plurality of storage apparatuses (the storage apparatuses 140, for example) where one or a plurality of logical volumes (real volumes or virtual volumes, for example) are provided, wherein, based on data information (may, for example, be raw data, data hash values, a data reduction capacity, or a hash value matching percentage) of data obtained through the generation of a request to write to a logical volume in the storage system, one storage apparatus among the plurality of storage apparatuses (may, for example, be the storage apparatus 140 with the lowest number, the storage apparatus 140 having the lowest CPU utilization or other such load, or a predesignated storage apparatus 140) calculates, for a plurality of combinations of storage apparatus and logical volume in the storage system (may, for example, be all combinations, insignificant combinations premised on similar volumes being aggregated as illustrated in FIG. 10, or combinations defined by the user), a data capacity when duplicate data is removed for each of the storage apparatuses (may, for example, be the actual data capacity or an estimated data capacity), calculates the total of the calculated data capacities as the total capacity of the whole storage system (the total capacity after an arrangement change, for example), and performs optimal arrangement arithmetic processing (the optimal arrangement arithmetic processing illustrated in FIG. 10, for example) to output information indicating a combination with the smallest total capacity among the plurality of combinations (may, for example, be an optimal arrangement or a provisional optimal arrangement that includes an optimal arrangement).

According to the foregoing configuration, because it is possible to specify a combination of storage apparatus and logical volume which has the smallest total capacity when duplicate data is removed, for example, duplicate data can be effectively removed on a system-wide basis.

In addition, with the storage system according to the present invention, for example, each of the plurality of storage apparatuses stores, as hash information (the hash value table 230, for example) for each logical volume, a block number enabling identification of a block which is a unit for storing data and a hash value of data written to the block, upon storing data according to a request from a host apparatus (the host apparatus 110, for example) to write to a logical volume, acquires hash values (may be hash values or volume information 1200 in which hash values are included, for example) stored by other storage apparatuses, compares, for each logical volume, the acquired hash values and hash values stored by its own storage apparatus, calculates, as data information (the data reduction capacity, for example) pertaining to logical volumes of its own storage apparatus, data capacities of matching hash values, and transmits the calculated data information (may, for example, be the data reduction capacity or a calculation result 1300 including the data reduction capacity) to the one storage apparatus, and wherein the one storage apparatus calculates the total of matching data capacities between logical volumes arranged in the storage apparatuses as a data capacity when duplicate data is removed.

According to the foregoing configuration, for example, because the calculation of the data reduction capacity is spread between each of the storage apparatuses, the load on one storage apparatus can be reduced.

In addition, the storage system according to the present invention may be configured such that data information calculated by each of the foregoing plurality of storage apparatuses is processed by one storage apparatus, for example. For example, each of the foregoing plurality of storage apparatuses transmits the stored hash value to the one storage apparatus, and the one storage apparatus compares the received hash value with the logical volumes arranged in the storage apparatus, and calculates data capacities of matching hash values as the data capacity when duplicate data has been removed.

According to the foregoing configuration, for example, because the calculation of the data reduction capacities is performed by one storage apparatus, system management is straightforward.

In addition, when data reduction capacities are compared by exchanging RAW data, for example, there can be a huge amount of communication between the storage apparatuses. In this regard, by exchanging hash values to perform a data comparison, a logical volume comparison between storage apparatuses can be carried out using a minimal communication amount and computation amount.

In addition, with the storage system according to the present invention, for example, the one storage apparatus selects, in descending order of data capacity, logical volumes which match one logical volume among the plurality of logical volumes as a plurality of logical volumes to be arranged in the storage apparatus of the storage system, and determines a combination of storage apparatus and logical volume in the storage system.

According to the foregoing configuration, for example, similar logical volumes can be estimated by selecting, in descending order of data capacity, logical volumes which match one logical volume, and insignificant combinations can be discarded by aggregating similar logical volumes, thereby reducing the calculation amount.

In addition, with the storage system according to the present invention, for example, each of the foregoing plurality of storage apparatuses includes a program that performs the foregoing optimal arrangement arithmetic processing (a program for implementing the optimal arrangement arithmetic processing unit 214, for example), acquires identification information (may be a storage apparatus ID or may be the ID of one storage controller 141 included in the storage apparatus 140) and fault states (for example, failure, where CPU utilization exceeds a threshold value, or similar) of other storage apparatuses in the storage system, determines whether or not the identification information of its own storage apparatus is the smallest among the storage apparatuses which are not in a fault state, and, when it is determined that its identification information is the smallest, executes the optimal arrangement arithmetic processing program and performs the optimal arrangement arithmetic processing.

According to the foregoing configuration, for example, simply by adding a storage apparatus in a data center or in a network, storage apparatuses automatically detect one another and optimal arrangement of volumes between the storage apparatuses is performed.

In addition, with the storage system according to the present invention, for example, each of the foregoing plurality of storage apparatuses is configured comprising a plurality of redundant storage controllers (the storage controllers 141, for example) and stores hash information in a storage area (the disk enclosure 142, for example) to which all the storage controllers included in its own storage apparatus are capable of referring, wherein each of the plurality of storage controllers has a program that performs the optimal arrangement arithmetic processing, and wherein, in each of the plurality of storage apparatuses, one storage controller (may be the storage controller 141 having the smallest number, the storage controller 141 for which the CPU utilization or another load is lowest, or a predesignated storage controller 141) among the storage controllers included in its own storage apparatus acquires identification information (may be the storage apparatus IDs or may be the IDs of the storage controllers 141) and fault states of the other storage apparatuses in the storage system, determines whether or not the identification information of its own storage apparatus is the smallest among the storage apparatuses which are not in a fault state, and, when it is determined that its identification information is the smallest, executes the optimal arrangement arithmetic processing program and performs the optimal arrangement arithmetic processing.

According to the foregoing configuration, for example, even when the storage controller that is performing the optimal arrangement arithmetic processing in the network fails, a storage controller of another storage apparatus is capable of performing the optimal arrangement arithmetic processing.

In addition, for example, because the storage controllers have redundancy within the storage apparatuses, data comparison, optimal arrangement arithmetic processing, and migration execution can be performed using a small load. Furthermore, even when a fault occurs in one storage controller, the other storage controller is able to take over the processing and perform deduplication processing.

In addition, with the storage system according to the present invention, for example, one storage apparatus indicates logical volume migration destinations for the plurality of storage apparatuses according to the results of the optimal arrangement arithmetic processing.

According to the foregoing configuration, for example, because duplicate data is removed by putting logical volumes to one side, communication does not take place between the storage apparatuses 140 for the sake of this processing even when a situation arises where removed data is restored, and therefore the performance of the whole storage system can be improved.

Moreover, with the storage system according to the present invention, for example, the one storage apparatus stores, as chronological information (the data reduction capacity transition 2110, for example), the data information, and time information indicating the time the data information is calculated, and wherein, in the optimal arrangement arithmetic processing, the one storage apparatus finds an approximation curve (the straight line 2121 which is a linear approximation to the transition 2111 illustrating a data reduction capacity transition, for example) from the chronological information, predicts data information of a predetermined time in the future (one month later, for example), and by using the predicted data information, calculates, for a plurality of combinations of storage apparatus and logical volume in the storage system, a data capacity when duplicate data is removed for each storage apparatus, calculates the total of the calculated data capacities as the total capacity of the whole storage system, and performs the optimal arrangement arithmetic processing to output information indicating the combination with the smallest total capacity among the plurality of combinations.

According to the foregoing configuration, for example, by storing previous data reduction capacities, the storage controller is able, when performing optimal arrangement arithmetic processing, to perform optimal arrangement arithmetic processing in which the data reduction capacity is predicted not only from the latest data but also from the details of previous data reduction capacities.

Furthermore, the foregoing configurations may be suitably changed, switched, combined, or omitted within a range that does not depart from the spirit of the present invention.

According to the foregoing configuration, duplicate data in a storage system can be more appropriately managed.

REFERENCE SIGNS LIST

100 . . . storage system, 140 . . . storage apparatus, 141 . . . storage controller.

The invention claimed is:

1. A storage system having a plurality of storage apparatuses in which one or a plurality of logical volumes are provided,
wherein, based on data information of data obtained through the generation of a request to write to a logical volume in the storage system, one storage apparatus among the plurality of storage apparatuses calculates, for a plurality of combinations of storage apparatus and logical volume in the storage system, a data capacity when duplicate data is removed for each of the storage apparatuses, calculates the total capacity of the whole storage system as the summation of the calculated data capacities, and performs optimal arrangement arithmetic processing to output information indicating a combination with the smallest total capacity among the plurality of combinations,
wherein each of the plurality of storage apparatuses:
stores, as hash information for each logical volume, a block number enabling identification of a block which is a unit for storing data and a hash value of data written to the block, upon storing data according to a request from a host apparatus to write to a logical volume,
acquires hash values stored by other storage apparatuses, compares, for each logical volume, the acquired hash values and hash values stored by its own storage apparatus, calculates, as data information pertaining to logical volumes of its own storage apparatus, data capacities of matching hash values, and transmits the calculated data information to the one storage apparatus, and
wherein the one storage apparatus calculates the total of matching data capacities between logical volumes arranged in the storage apparatuses as a data capacity when duplicate data is removed.

2. The storage system according to claim 1,
wherein each of the plurality of storage apparatuses:
transmits the stored hash value to the one storage apparatus, and
wherein the one storage apparatus compares the received hash value with the logical volumes arranged in the storage apparatus, and calculates data capacities of matching hash values as a data capacity when duplicate data is removed.

3. The storage system according to claim 2,
wherein the one storage apparatus selects logical volumes, in descending order of data capacity, which match one logical volume among the plurality of logical volumes as a plurality of logical volumes to be arranged in the storage apparatus of the storage system, and determines a combination of storage apparatus and logical volume in the storage system.

4. The storage system according to claim 1,
wherein the one storage apparatus selects logical volumes, in descending order of data capacity, which match one logical volume among the plurality of logical volumes as a plurality of logical volumes to be arranged in the storage apparatus of the storage system, and determines a combination of storage apparatus and logical volume in the storage system.

5. The storage system according to claim 1,
wherein each of the plurality of storage apparatuses has a program that performs the optimal arrangement arithmetic processing, acquires identification information and fault states of the other storage apparatuses in the storage system, determines whether or not the identification information of its own storage apparatus is the smallest among the storage apparatuses which are not in a fault state, and, when it is determined that its identification information is the smallest, executes the optimal arrangement arithmetic processing program and performs the optimal arrangement arithmetic processing.

6. The storage system according to claim 1,
wherein each of the plurality of storage apparatuses:
is configured comprising a plurality of redundant storage controllers, and
stores the hash information in a storage area to which all the storage controllers included in its own storage apparatus are capable of referring,
wherein each of the plurality of storage controllers has a program that performs the optimal arrangement arithmetic processing, and wherein, in each of the plurality of storage apparatuses, one storage controller among the storage controllers included in its own storage apparatus acquires identification information and fault states of the other storage apparatuses in the storage system, determines whether or not the identification information of its own storage apparatus is the smallest among the storage apparatuses which are not in a fault state, and, when it is determined that its identification information is the smallest, executes the optimal arrangement arithmetic processing program and performs the optimal arrangement arithmetic processing.

7. The storage system according to claim 1, wherein the one storage apparatus indicates a logical volume migration destination for the plurality of storage apparatuses according to the results of the optimal arrangement arithmetic processing.

8. The storage system according to claim 1, wherein the one storage apparatus stores, as chronological information, the data information, and time information indicating the time the data information is calculated, and wherein, in the optimal arrangement arithmetic processing, the one storage apparatus finds an approximation curve from the chronological information, predicts data information of a predetermined time in the future, and by using the predicted data information, calculates, for a plurality of combinations of storage apparatus and logical volume in the storage system, a data capacity when duplicate data is removed for each storage apparatus, calculates the total of the calculated data capacities as the total capacity of the whole storage system, and performs the optimal arrangement arithmetic processing to output information indicating the combination with the smallest total capacity among the plurality of combinations.

9. A data management method of a storage system having a plurality of storage apparatuses in which one or a plurality of logical volumes are provided, the data management method comprising:

a first step in which, based on data information of data obtained through the generation of a request to write to a logical volume in the storage system, one storage apparatus among the plurality of storage apparatuses calculates, for a plurality of combinations of storage apparatus and logical volume in the storage system, a data capacity when duplicate data is removed for each of the storage apparatuses;

a second step of calculating the total capacity of the whole storage system as the summation of the calculated data capacities; and a third step of performing optimal arrangement arithmetic processing to output information indicating a combination with the smallest total capacity among the plurality of combinations, wherein each of the plurality of storage apparatuses:
stores, as hash information for each logical volume, a block number enabling identification of a block which is a unit for storing data and a hash value of data written to the block, upon storing data according to a request from a host apparatus to write to a logical volume, acquires hash values stored by other storage apparatuses, compares, for each logical volume, the acquired hash values and hash values stored by its own storage apparatus, calculates, as data information pertaining to logical volumes of its own storage apparatus, data capacities of matching hash values, and transmits the calculated data information to the one storage apparatus, and wherein the one storage apparatus calculates the total of matching data capacities between logical volumes arranged in the storage apparatuses as a data capacity when duplicate data is removed.

* * * * *